United States Patent
Lee et al.

(10) Patent No.: US 11,327,018 B2
(45) Date of Patent: May 10, 2022

(54) SUB-DIFFRACTION IMAGING, CODING AND DECODING OF NON-BLEACHING SCATTERS

(71) Applicant: THE REGENTS OF THE UNIVERSITY OF MICHIGAN, Ann Arbor, MI (US)

(72) Inventors: Somin Eunice Lee, Ann Arbor, MI (US); Yunbo Liu, Ann Arbor, MI (US); Yipei Wang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 30 days.

(21) Appl. No.: 17/047,124

(22) PCT Filed: Apr. 12, 2019

(86) PCT No.: PCT/US2019/027204
§ 371 (c)(1),
(2) Date: Oct. 13, 2020

(87) PCT Pub. No.: WO2019/200248
PCT Pub. Date: Oct. 17, 2019

(65) Prior Publication Data
US 2021/0148824 A1 May 20, 2021

Related U.S. Application Data

(60) Provisional application No. 62/657,045, filed on Apr. 13, 2018.

(51) Int. Cl.
*G01N 21/64* (2006.01)
*G02B 21/36* (2006.01)

(52) U.S. Cl.
CPC ..... *G01N 21/6458* (2013.01); *G01N 21/6428* (2013.01); *G01N 21/6445* (2013.01); *G02B 21/367* (2013.01)

(58) Field of Classification Search
CPC ............ G02B 21/367; G01N 21/6458; G01N 21/6428; G01N 21/6445
See application file for complete search history.

(56) References Cited

U.S. PATENT DOCUMENTS 9,378,542 B2 * 6/2016 Meyers ................ G06K 9/4642
9,581,548 B2 * 2/2017 Cooper ................. G02B 27/58
(Continued)

FOREIGN PATENT DOCUMENTS

| KR | 101410090 B1 | 6/2014 |
| KR | 101762384 B1 | 8/2017 |
| WO | WO-2010-105015 A2 | 9/2010 |

OTHER PUBLICATIONS

International Search Report and Written Opinion of the International Searching Authority, issued in PCT/US2019/027204, dated Aug. 6, 2019; ISA/US.

*Primary Examiner* — David P Porta
*Assistant Examiner* — Djura Malevic
(74) *Attorney, Agent, or Firm* — Harness, Dickey & Pierce, P.L.C.

(57) ABSTRACT

An image reconstruction method includes capturing a reference image of the specimen and capturing a set of original images based on the reference image. The method includes generating a set of analyzed images based on the set of original images by determining an intensity distribution for each pixel of each original image of the set of original images and combining the intensity distribution at each pixel location across the set of original images into an intermediate image. The method includes, identifying an object in the intermediate image. In response to identifying the object (Continued)

in the intermediate image, determining an intensity value of the object in each original image of the set of original images and generating an improved image of the object based on the determined intensity value of the object. The method includes generating a final image including the improved image of the object and displaying the final image.

20 Claims, 15 Drawing Sheets

(56) References Cited

U.S. PATENT DOCUMENTS

| | | | | |
|---|---|---|---|---|
| 9,651,493 | B2* | 5/2017 | Goodwin | G02B 21/02 |
| 9,727,959 | B2* | 8/2017 | Meyers | G06T 5/008 |
| 10,241,050 | B2* | 3/2019 | Goodwin | G02B 21/367 |
| 10,852,520 | B2* | 12/2020 | Hillman | G01J 3/36 |
| 10,955,652 | B2* | 3/2021 | Hillman | G02B 21/22 |
| 2011/0006231 | A1* | 1/2011 | Betzig | G02B 26/06 250/578.1 |
| 2011/0149097 | A1* | 6/2011 | Danuser | G01N 21/636 348/222.1 |
| 2013/0300853 | A1* | 11/2013 | Goodwin | G02B 21/367 348/79 |
| 2014/0184777 | A1* | 7/2014 | Kleppe | G02B 21/0076 348/79 |
| 2014/0340570 | A1* | 11/2014 | Meyers | H04N 5/2256 348/370 |
| 2014/0375673 | A1* | 12/2014 | Ishiga | H04N 9/04557 345/591 |
| 2015/0241351 | A1* | 8/2015 | Cooper | G01N 21/6458 250/459.1 |
| 2016/0005154 | A1* | 1/2016 | Meyers | G06T 5/008 382/274 |
| 2017/0018061 | A1* | 1/2017 | Meyers | G06K 9/4642 |
| 2017/0178318 | A1 | 6/2017 | Wang et al. | |
| 2017/0248521 | A1* | 8/2017 | Goodwin | G01B 11/002 |
| 2021/0208427 | A1* | 7/2021 | Lee | G02F 1/0136 |

* cited by examiner i. Diffraction limited

Optical microscopy
(darkfield)

ii. Non-bleaching
Sub-diffraction

Nano-scatterers: time-series reconstruction images

Fluorophore: time-series reconstruction images

SUB-DIFFRACTION IMAGING, CODING AND DECODING OF NON-BLEACHING SCATTERS

CROSS REFERENCE

This application is a 371 U.S. National Phase of International Application No. PCT/US2019/027204, filed Apr. 12, 2019, which claims benefit of U.S. Provisional Application No. 62/657,045, filed on Apr. 13, 2018. The entire disclosures of the above applications are incorporated herein by reference.

GOVERNMENT SUPPORT CLAUSE

This invention was made with government support under Contract No. FA9550-16-1-0272 awarded by the Air Force Office of Scientific Research and Contract No. ECCS-1454188 awarded by the National Science Foundation. The Government has certain rights in this invention.

FIELD

The present disclosure relates to coding, encoding, and decoding non-bleaching scatterers and, more specifically, implementing an image reconstruction algorithm for long-term imaging and encoding disorder into patterns.

BACKGROUND

To achieve spatial resolution below the diffraction limit, super-resolution fluorescence requires repeated activation and deactivation of fluorophores until fluorophores eventually irreversibly photobleach, precluding long-term imaging endeavors. Thus, high spatial resolution comes at a cost to long-term temporal capabilities. As investigations of biological processes demand longer time observation windows previously unreachable by super-resolution fluorescence, a non-bleaching strategy is needed.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An image reconstruction method includes capturing a reference image of the specimen and capturing a set of original images based on the reference image, where each original image of the set of original images has a corresponding amplitude, phase, and polarization. The image reconstruction method includes generating a set of analyzed images based on the set of original images by determining an intensity distribution for each pixel of each original image of the set of original images and combining the intensity distribution at each pixel location across the set of original images into an intermediate image. The image reconstruction method includes, identifying an object in the intermediate image. In response to identifying the object in the intermediate image, determining an intensity value of the object in each original image of the set of original images and generating an improved image of the object based on the determined intensity value of the object. The image reconstruction method includes generating a final image including the improved image of the object and displaying the final image.

In other aspects, the image reconstruction method includes determining the intensity value of the object in response to the intermediate image being greater than a predetermined similarity threshold to the reference image. In other aspects, generating the set of analyzed images includes identifying pixel intensities of a plurality of pixels in each original image across the set of original images and calculating the intensity distribution for each pixel of the plurality of pixels of each original image of the set of original images to generate the set of analyzed images. In other aspects, generating the set of analyzed images includes generating the intermediate image by, for each pixel of the plurality of pixels, combining the calculated intensity at each pixel across each analyzed image of the set of analyzed images.

In other aspects, the intensity distributions are background-free and noise-free. In other aspects, each analyzed image of the set of analyzed images includes, at each pixel location of a selected analyzed image, the intensity distribution of the pixel corresponding to the object location in the original image. In other aspects, obtaining the intensity distribution includes applying an optimization algorithm to each pixel of the plurality of pixels. In other aspects, the optimization algorithm is a fast-iterative shrinkage-thresholding algorithm. In other aspects, the set of original images is captured by adjusting a voltage of a voltage tunable polarizer and capturing each original image of the set of original images at a transmission polarization direction corresponding to the voltage.

In other aspects, the corresponding amplitude, phase, and polarization of each original image of the original images is captured by adjusting the amplitude and the phase using a spatial light. In other aspects, a highest intensity value of the object indicates a resolved object, and the final image includes an image of each object at the amplitude, phase, and polarization where the object is resolved. In other aspects, in response to the intermediate image being less than a predetermined similarity threshold to the reference image, the method includes displaying the intermediate image.

In other aspects, the image reconstruction method includes analyzing the intermediate image by identifying a highest intensity of each object based on a difference in the intensity value between each original image of the set of original images and combining the corresponding original image of the set of original images having the highest intensity of each object into the intermediate image to generate the final image. In other aspects, displaying the final image includes displaying the final image on a display screen of at least one of (i) a photographic imaging system and (ii) a computing device.

A photographic imaging system includes a camera that captures images of objects of interest and a voltage-tunable polarizer disposed in light path of the camera. In response to a voltage applied thereto, the voltage-tunable polarizer changes polarization state of light propagating therethrough without mechanical rotation of the voltage-tunable polarizer itself. The system includes a controller operably coupled to the voltage-tunable polarizer to supply voltage to the voltage-tunable polarizer and a processor and associated memory for storing instructions. The instructions, upon execution, cause the processor to capture a reference image of the specimen and capture a set of original images based on the reference image, where each original image of the set of original images has a corresponding amplitude, phase, and polarization. The instructions further include generating a set of analyzed images based on the set of original images by determining an intensity distribution for each pixel of each original image of the set of original images and combining the intensity distribution at each pixel location across the set of original images into an intermediate image. The instructions include, identifying an object in the intermediate image and, in response to identifying the object in the intermediate image, determining an intensity value of the object in each original image of the set of original images and generating an improved image of the object based on the determined intensity value of the object. The instructions include generating a final image including the improved image of the object and displaying the final image.

The instructions include determining the intensity value of the object in response to the intermediate image being greater than a predetermined similarity threshold to the reference image. The instructions include generating the set of analyzed images by identifying pixel intensities of a plurality of pixels in each original image across the set of original images and calculating the intensity distribution for each pixel of the plurality of pixels of each original image of the set of original images to generate the set of analyzed images. The instructions include generating the intermediate image by, for each pixel of the plurality of pixels, combining the calculated intensity at each pixel across each analyzed image of the set of analyzed images.

In other aspects, the intensity distributions are background-free and noise-free. In other aspects, each analyzed image of the set of analyzed images includes, at each pixel location of a selected analyzed image, the intensity distribution of the pixel corresponding to the object location in the original image. In other aspects, obtaining the intensity distribution includes applying an optimization algorithm to each pixel of the plurality of pixels. In other aspects, the optimization algorithm is a fast-iterative shrinkage-thresholding algorithm.

In other aspects, the set of original images is captured by adjusting the voltage of the voltage tunable polarizer and capturing each original image of the set of original images at a transmission polarization direction corresponding to the voltage. In other aspects, the corresponding amplitude, phase, and polarization of each original image of the original images is captured by adjusting the amplitude and the phase using a spatial light. In other aspects, a highest intensity value of the object indicates a resolved object, and the final image includes an image of each object at the amplitude, phase, and polarization where the object is resolved.

In other aspects, in response to the intermediate image being less than a predetermined similarity threshold to the reference image, the instructions include displaying the intermediate image. In other aspects, the instructions include analyzing the intermediate image by identifying a highest intensity of each object based on a difference in the intensity value between each original image of the set of original images and combining the corresponding original image of the set of original images having the highest intensity of each object into the intermediate image to generate the final image. In other aspects, displaying the final image includes displaying the final image on a display screen of at least one of (i) a photographic imaging system and (ii) a computing device.

An information encoding method includes identifying captured information. The information encoding method includes generating an emergent pattern of the captured information using an emergent model by selecting a pattern type and determining a set of parameters based on a similarity metric and a sensitivity metric using the pattern type. The sensitivity metric indicating a complexity level of the pattern type, and the similarity metric indicating a similarity between patterns within the pattern type. The information encoding method includes generating a first arrangement of objects within a feature of the captured information and generating a second arrangement of objects in an absence of the feature in the captured information. The information encoding method includes developing an encoded image by combining the first arrangement of objects and the second arrangement of objects.

In other aspects, the information encoding method includes identifying each object of the encoded image and, in response to at least one nearby object within a threshold distance of the identified object having the same arrangement, selecting each nearby object and adjusting an arrangement of each nearby object. In other aspects, the adjusting the arrangement includes identifying a nearby object within the feature or the absence of the feature. In response to the nearby object being within the feature, the adjusting the arrangement includes using a new arrangement and, in response to the nearby object being within the absence of the feature, the adjusting the arrangement includes using a different new arrangement.

In other aspects, the similarity metric is calculated by converting two emergent patterns into a first matrix and a second matrix. Each entry of the first matrix represents a presence or absence of objects in a first pattern and each entry of the second matrix the presence or absence of objects in a second pattern. In other aspects, the similarity metric is calculated by generating a first distance matrix and a second distance matrix. Each entry of the first distance matrix and each entry of the second distance matrix represents a distance between the entry and a nearest object. In other aspects, the similarity metric is calculated by calculating the similarity metric as an average of the sum of the product of the first matrix and the second distance matrix and the sum of the product of the second matrix and the first distance matrix.

In other aspects, the encoded image includes encoded information, and the encoded image is sub-diffraction. In other aspects, the encoded information is decoded using an imaging system. In other aspects, the first arrangement and the second arrangement represent an orientation of scatterers.

An information encoding method includes identifying a set of captured information and generating a set of emergent patterns corresponding to the set of captured information using an emergent model by selecting a set of pattern types and determining a set of parameters based on a similarity metric and a sensitivity metric using the selected pattern type. The sensitivity metric indicating a complexity level of the pattern type, and the similarity metric indicating a similarity between patterns within each pattern type. The information encoding method includes generating a first arrangement of objects within features in the set of captured information, generating a second of arrangement of objects in an absence of the features in the captured set of information, and developing an encoded image by combining the first arrangement of objects and the second arrangement of objects.

In other aspects, the information encoding method includes identifying each object of the encoded image and, in response to at least one nearby object within a threshold distance of the identified object having the same arrangement, selecting each nearby object and adjusting an arrangement of each nearby object. In other aspects, the adjusting the arrangement includes identifying a nearby object within the features or the absence of the features. In response to the nearby object being within the feature, the adjusting the arrangement includes using a new arrangement. In response to the nearby object being within the absence of the feature, the adjusting the arrangement includes using a different new arrangement.

DRAWINGS

The present disclosure will become more fully understood from the detailed description and the accompanying drawings.

DETAILED DESCRIPTION

Figure 1A:
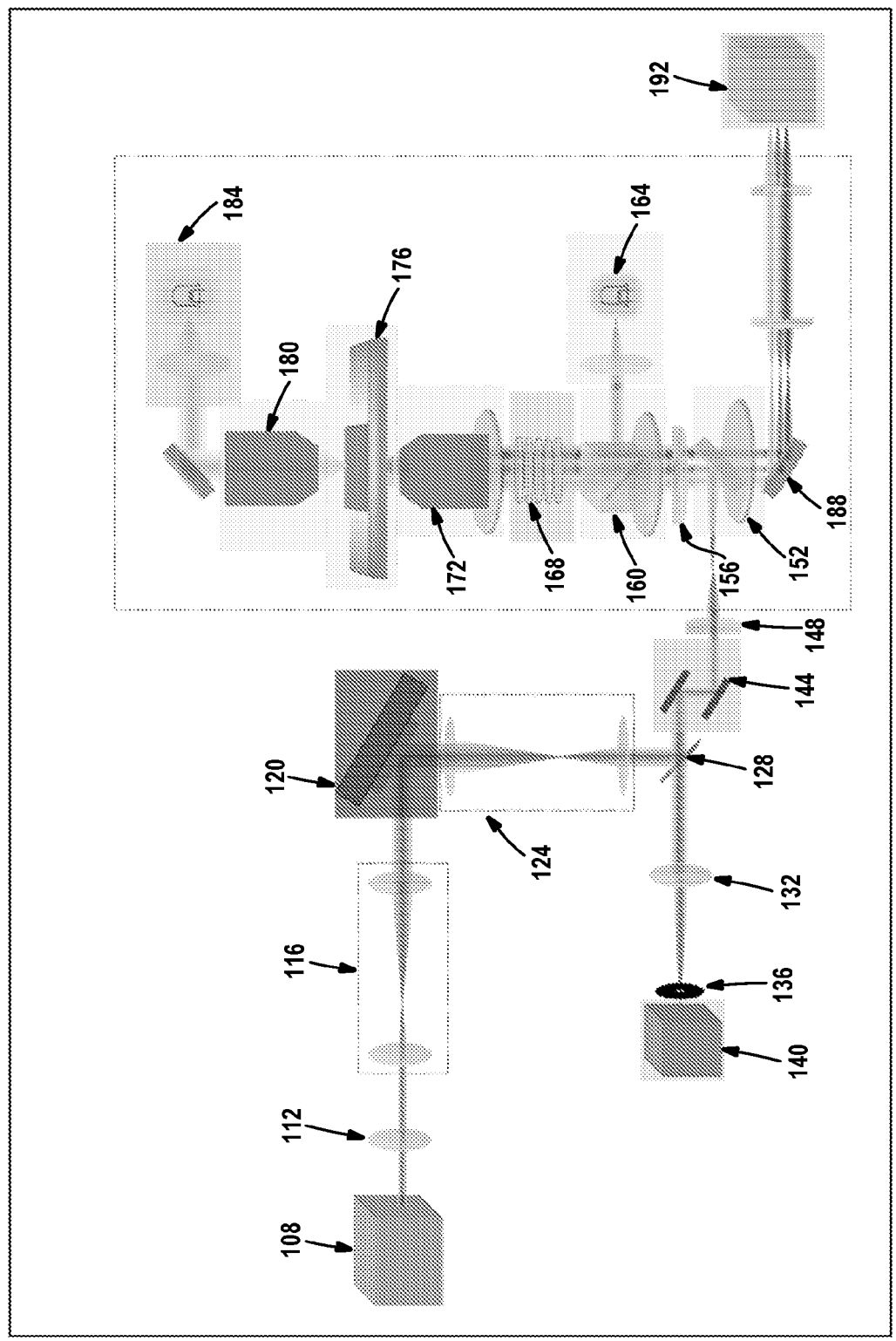
FIG. 1A is another exploded view of an example microscope including a voltage-tunable polarizer and spatial light modulator.
Figure 1B:
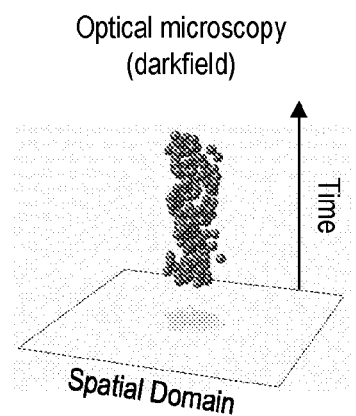
FIG. 1B is a graphical representation of a diffraction limited image and a sub-diffraction image.
Figure 1B:
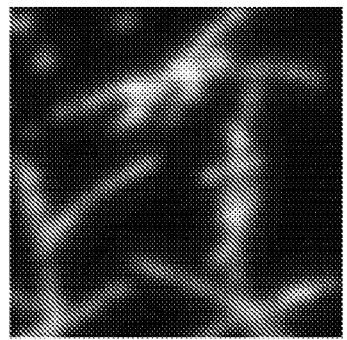
Figure 1B:
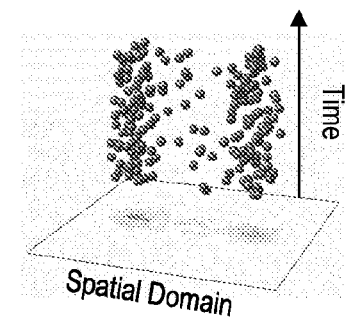
Figure 1B:
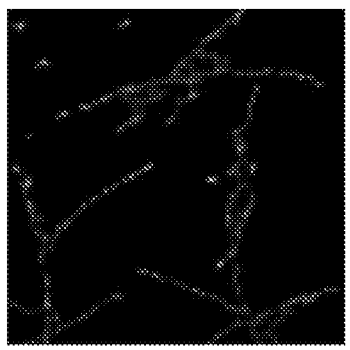

An image reconstruction method of the present disclosure enables optical imaging of non-bleaching scatterers below a diffraction limit. Unlike organic fluorophores and quantum dots, scatterers do not photobleach, blink, or fade. Rather, amplitude, phase and polarization modulation allows for Airy patterns of proximal scatterers to be segregated to break the diffraction limit. For example, non-correctible spatial errors are suppressed by tuning the transmission polarization using a microscope including a voltage tunable polarizer 104, as shown in FIGS. 1A-1B. By applying amplitude-modulated voltages, high-speed modulation of the transmission polarization and/or modulation of transmission intensity can be achieved for dynamic polarization nano-imaging. The polarization response of anisotropic scatterers dictates their relative intensity under polarization modulation, which increases the sparsity of the sample to aid sub-diffraction/super-resolution imaging. High spatial resolution images are then reconstructed to optically resolve individual scatterers.

The transmission polarization may be stably tuned to resolve non-bleaching nano-scatterers (e.g., gold nanorods) with spatial accuracy (e.g., ±0.02λ) far below the diffraction limit, and scaling to n number of nano-scatterers to practically implement non-bleaching sub-diffraction imaging (e.g., 0.18±0.02λ) over extended time observation windows, for example, greater than one week.

To realize this non-bleaching sub-diffraction strategy, plasmonic nano-scatterers whose spatial positions can be ascertained below the diffraction limit using polarization are used. Unlike fluorophores, nano-scatterers do not photobleach. Thus far, imaging efforts have been severely constrained to a limited number of nano-scatterers (one to a few) with large spatial errors, slowing the broad application of non-bleaching methods to the biological sciences. Implementing plasmonic nano-scatterers avoids uncorrectable spatial errors and is scalable to n number of nano-scatterers.

The present image reconstruction method harnesses voltage to stably tune the transmission polarization angle in order to eliminate uncorrectable spatial errors necessary for long-term sub-diffraction imaging. The transmission polarization angle (θ) can be rapidly tuned with a response time of milliseconds for dynamic, high-speed nano-imaging. Further, the present image reconstruction method is spatially stable with accuracies far below the diffraction limit for direct visualization of proximal nano-scatterers that were previously unresolvable. The image reconstruction method has been scaled to resolve patterned filaments with sub-diffraction resolution over extended time observation windows with low error. Finally, this non-bleaching sub-diffraction imaging method visualizes nano-scatterers labeled actin filament networks and uncovers their morphological changes and structural dynamics during the actin filament organization process. These non-bleaching sub-diffraction methods will provide more opportunities and methods for biological investigations across the time continuum.

The present image reconstruction method provides advantages of being insusceptible to bleaching and fading of a biological sample; providing high spatial and temporal resolution simultaneously; being compatible with any optical microscope methods with no illumination, observation window, or hardware restrictions; and being compatible with any scatterers exhibiting polarization anisotropy. In this way, the present image reconstruction method may be applied to long-term and continuous sub-diffraction imaging and bio-imaging as well as implemented in sub-diffraction non-bleaching labelling in molecular biology, electronic, consumer goods, food, and agriculture industry.

As referenced above, FIG. 1A is an exploded view of an example microscope including a voltage-tunable polarizer 104 and a spatial light modulator 120 is shown. The voltage-tunable polarizer 104 is disposed in light path of the optical microscope. For example, the voltage-tunable polarizer 104 may be designed as an insert to fit into a polarizer port of the microscope or another ports of the microscope. In response to a voltage applied thereto, the voltage-tunable polarizer 104 changes polarization state of light propagating through the polarizer without mechanical rotation of the polarizer itself. In a simple form, the voltage-tunable polarizer is implemented by a pair of liquid crystal variable retarders aligned in series in the light path of the microscope.

An example of photographic applications, where the voltage tunable polarizer 104 is integrated into a photographic camera. The system is comprised generally of a photographic camera, a voltage tunable polarizer and a controller. While references are made to a nano-imaging and photographic applications, it is readily understood that the voltage-tunable polarizer described herein has other applications, including but not limited to a neutral density filter for variable light exposure. The voltage-tunable polarizer has application for still and live photography in, automotive camera systems, ship/boat camera systems, underwater camera systems, flight/plane camera systems, consumer electronics camera systems (laptop, cell phone, etc.), space shuttle camera systems, autonomous camera systems, surveillance camera systems, scientific camera systems, etc. as well as application in sensor enabled eye glass wear, adjustable smart eye glass wear, etc.

In example embodiments, the voltage-tunable polarizer may have a compact sandwich structure, consisting of two variable liquid crystal retarders, two λ/4 achromatic polymer retarder films (i.e., quarter waveplate) and a high-contrast linear polarizing film. More specifically, a first quarter waveplate is configured to receive the light from the optical microscope. A first liquid crystal retarder is positioned adjacent to the first quarter waveplate and configured to receive the light passing through the first quarter waveplate. The linear polarizer has an incoming surface and an outgoing surface. The incoming surface of the linear polarizer is adjacent to the first liquid crystal retarder and thus receives the light passing through the first liquid crystal retarder. The outgoing surface of the linear polarizer is adjacent to a second liquid crystal retarder. The second liquid crystal retarder receives the light passing through the linear polarizer. Lastly, a second quarter waveplate is positioned adjacent to the second liquid crystal retarder and is configured to receive the light passing through the second liquid crystal retarder.

The transmission axis of the linear polarizing film and the fast axis of the polymer retarder films are both parallel with respect to the x-axis, while the fast axis of the liquid crystal retarders are aligned at forty-five or odd multiples of forty-five degrees with the x-axis. That is, the transmission axis of the linear polarizer is parallel with the fast axis of the first quarter waveplate and the fast axis of the second quarter waveplate. The fast axis of the first liquid crystal retarder resides in a plane that is parallel with the transmission axis of the linear polarizer but is aligned at forty-five or odd multiples of forty-five degrees from the transmission axis of the linear polarizer. Likewise, the fast axis of the second liquid crystal retarder resides in a plane that is parallel with the transmission axis of the linear polarizer but is aligned at forty-five degrees from the transmission axis of the linear polarizer. By applying amplitude-modulated voltage on the liquid crystal retarders, the polarization transmission axis of the optically active polarizer can be rotated ranging from 0 degree to 180 degree with microsecond to millisecond response time.

Additional details and descriptions regarding the microscope and voltage-tunable polarizer 104 are included in PCT patent application No. PCT/US2018/060128 filed on Nov. 9, 2018 and entitled "Voltage-Tunable Polarizer," which is incorporated by reference in its entirety. In principle, it is possible to accurately determine spatial positions of scatterers by polarization anisotropy when spatial errors are suppressed.

Referring to FIG. 1A, the example microscope includes a laser 108, for example, a Ti:sapphire laser. The laser 108 may be used for laser scanning microscopy, optical control, and Rayleigh and Mie scattering. The wavelength may be tuned from 400 to 1100 nm, which lies within the resonant wavelength range of plasmonic nano-scatterers. The maximum power may be as high as ~2.2 W@790 nm and ~800 mW@675 nm, which fits the requirement for greater than 2 W for optical control and greater than 100 mW for laser scanning imaging.

The example microscope includes a half-wave plate 112. The half-wave plate is used to change the laser polarization direction to excite plasmonic nano-scatterers. The working wavelength of the half-wave plate 112 may be 690 nm to 1200 nm, which covers the output wavelengths of the laser. The example microscope includes a beam expander 116. The beam expander 116 is used to expand the laser beam to fill the window of the spatial light modulator. Lenses with 2.5 cm focal length and 10 cm focal length may be used to magnify the laser beam. Anti-reflective lens may also be chosen to avoid power loss.

The example microscope includes a spatial light modulator 120. The spatial light modulator 120 can modulate the wave front to create a desired beam structure. The pixel size may be chosen to be 6 μm and the pixel number may be 1920*1080. The high pixel number and small pixel size is expected to optimally modulate the beam. The example microscope includes a beam shrinker 124. The beam shrinker 124 will shrink the expanded beam back to less than 4 mm to match the size of the scanning mirror. Lenses with 2.5 cm focal length and 7.5 cm focal length may be used. This lens pair, the spatial light modulator 120, and the scanner are designed to form a 4f system.

The example microscope includes a beam splitter 128. The beam splitter 128 enables the separation of the excitation beam and the scattering beam. For excitation, 50% of the incident will be reflected into the microscope. For detection, 50% of the scattered signal beam will be transmitted into the PMT detector. The beam splitter 128 wavelength may be 600-1700 nm to cover the laser working wavelength. The example microscope includes a tube lens 132. The tube lens 132 is used to focus the scattered signal beam into a single point. The focal length may be 10 cm due to space consideration and available pinhole sizes.

The example microscope includes a pinhole 136. The pinhole 136 functions to block the out of focus signal and reduce the imaging background. The pinhole 136 size may be 25 μm, which matches the focused beam size after passing through the tube lens. The example microscope includes a photomultiplier tube (PMT) detector 140. The PMT detector 140 is used to detect the light signal and convert the light signal into an electric voltage signal. The PMT response wavelength ranges from 230 nm to 920 nm, covering wavelengths of interest. The bandwidth of the PMT may be greater than 1 MHz for high-speed imaging.

The example microscope includes an X-Y galvo scanning mirror set 144. The galvo mirrors 144 are used for raster scanning. The short response time (500 μs) and high precision features of this galvo scanning mirror set enables ~2-4 images per second to be achieved. The example microscope includes a scan lens 148. The scan lens 148 is designed to work with a tube lens (component 156) to magnify the laser beam, to fill the back-aperture of the objective lens, and to relay the scanner's image onto that plane. An achromatic doublet is chosen to minimize imaging aberrations. The focal length may be 5 cm.

The example microscope includes a beam splitter rotor or motorized rotor 126. The motorized rotor 152 allows the user to choose 0:100/50:50/100:0 beam splitters without manually rotating the rotor, enabling the user to do laser scanning/optical control (0:100), Rayleigh and Mie scattering imaging (50:50), and fluorescent imaging/darkfield imaging (100:0) under the same scheme at the same time. This enables different imaging microscopies to be conducted together for extended time periods.

The example microscope includes a tube lens 156. The tube lens 156 is housed inside the microscope. This tube lens 156 and the scan lens 148 form a $4f$ system. The tube lens 156 and scan lens 148 pair will magnify the laser focus to match the back-aperture of the objective lens. The focal length of the microscope may be 18 cm.

The example microscope includes a motorized mirror turret 160. The motorized mirror turret 160 allows the user to electrically change the filter/dichroic mirror cubes, DIC cubes, and dark field cubes. The motorized function enables users to do multiple imaging microscopies at the same time.

The example microscope includes a white light LED 164. The high power white light LED 164 is used for fluorescence excitation. Fluorescence will be used as a comparison to verify non-bleaching capabilities. The lens collimates the beam. The beam is then reflected by the motorized mirror turret 160 and coupled into the objective lens.

Referring back to the IVP system 104, the IVP system is used to electrically tune the transmission polarization direction. Only light that is parallel to the transmission direction will pass the IVP. Since it is electrically controlled, the IVP is capable of fast switching and spatial precision. The combination of other motorized components enables the user to do different imaging microscopies at the same time.

The example microscope includes a motorized objective lens turret 172 with z drift compensation system. The motorized objective lens turret 172 can be switched electrically. The z drift compensation enables the microscope to achieve long-term imaging without influence of z drifting. The example microscope includes a motorized nano+micro stage 176. The nano+micro stage 176 will offer ~1 nm precision control to fit the requirement for high precision sample manipulation. This highly stable stage will also allow for compensation from image drifting during long-term imaging.

The example microscope includes a condenser 180. The condenser 180 focuses the LED light onto the sample. Above the condenser is a field iris diaphragm, which can be used to adjust the field of view. The example microscope includes a LED light source and collimator 184. Visible and NIR LED light bulbs are selected to have greater than 10 mW intensity at a single wavelength. The collimator is used to collimate the LED light.

The example microscope includes a mirror 188 that functions to reflect the fluorescent/darkfield/scanning image into a CCD 192. The CCD 192 provides high sensitivity and high-speed imaging for long-term bioimaging. The CCD 192 will work in conjunction with other motorized elements to achieve different types of imaging microscopies at the same time. FIG. 1B is a graphical representation of a diffraction limited image and a sub-diffraction image.

Figure 2A:
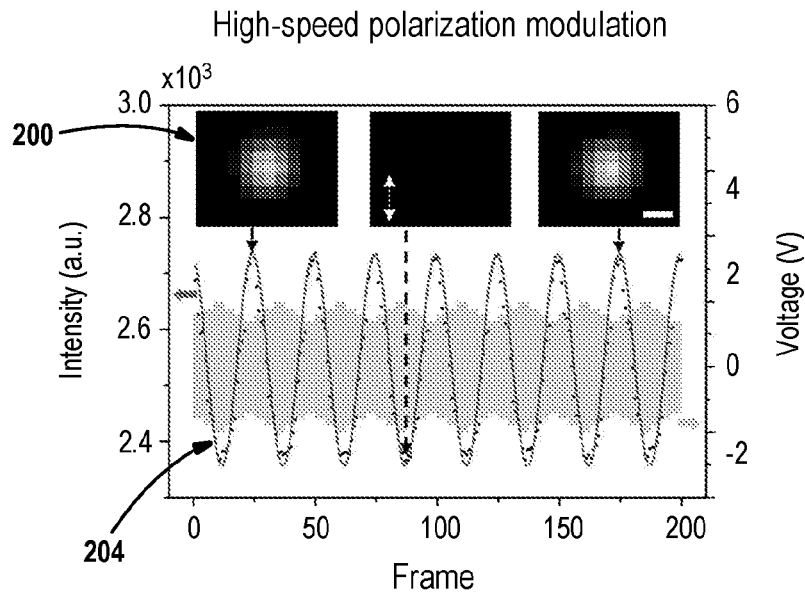
FIG. 2A depicts example proximal scatterers modulated with transmission polarization.
Figure 2B:
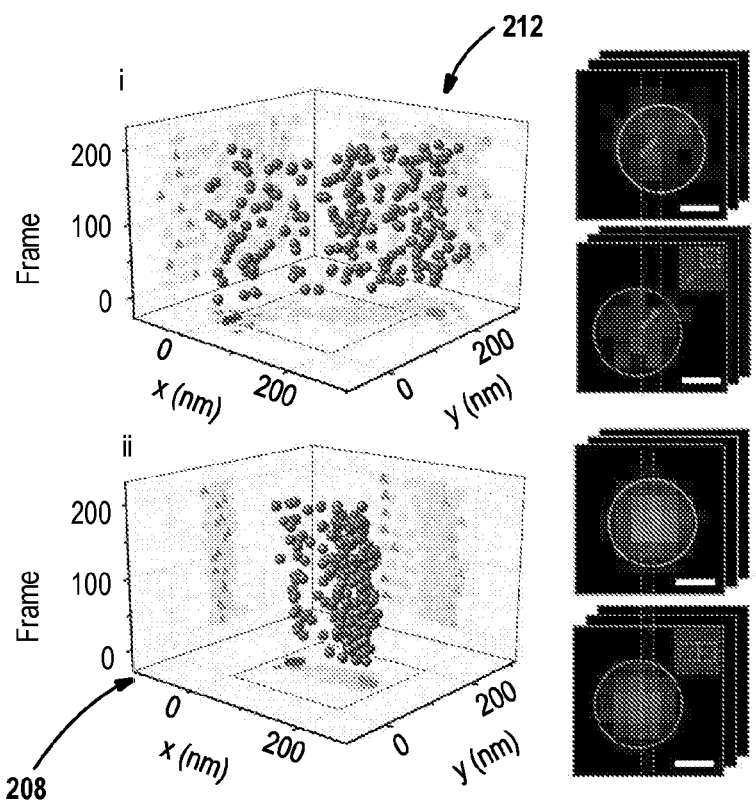
FIG. 2B depicts a three dimensional visualization of proximal scatterers that are diffraction limited and below a diffraction limit.

Referring now to FIG. 2A, example proximal scatterers modulated with transmission polarization is shown. The scattering intensity of a single scatterer 200 is modulated with transmission polarization 204. A transmission polarization axis can be tuned using voltage, spatial errors at the nanometer scale are suppressed and proximal scatterers, which are below diffraction limit, can be physically distinguished by direct observation without any spatial image correction. Voltage actuation also allows automated and high-speed acquisition of images from the CCD. From far-field images, individual Airy patterns corresponding to proximal scatterers can be directly differentiated without any image correction. Referring now to FIG. 2B, a three dimensional visualization of proximal scatterers diffraction limited 208 and below a diffraction limit 212 and a pixel limit are shown. The scale bar in FIGS. 2A-2B is 500 nm. Positional information of segregated scatterers is clearly revealed in FIG. 2B, representing the first time of directly visualizing segregated scatterers at the nanoscale without post-processing.

Figure 3:
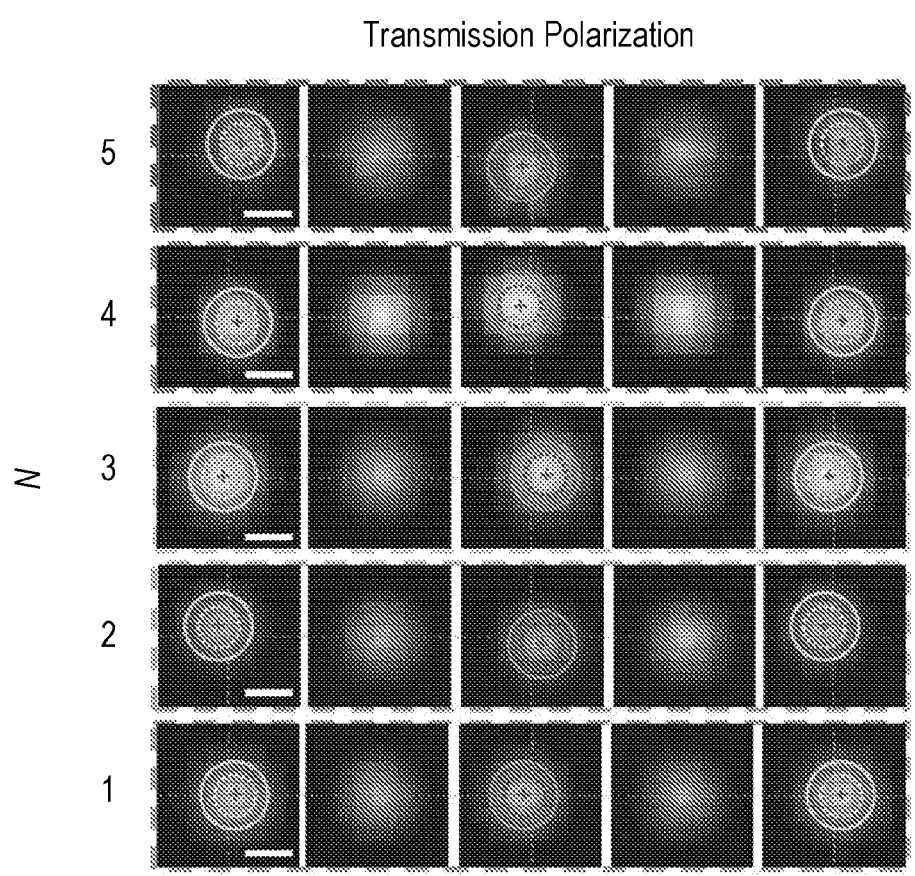
FIG. 3 is a diagrammatic view of sequential images of sets of proximal nanorods that indicate positional information.

FIG. 3 is a diagrammatic view of sequential images of N1-N5 sets of proximal nanorods that indicate positional information with a scale bar of 500 nm. By obtaining the center positions of individual Airy patterns of proximal scatterers from the far-field images, spatial positions of scatterers may be accurately ascertained with an uncertainty far below the size of the Airy patterns and CCD pixel, permitting proximal scatterers to be distinguished beyond the diffraction limit and pixel limit.

Figure 4:
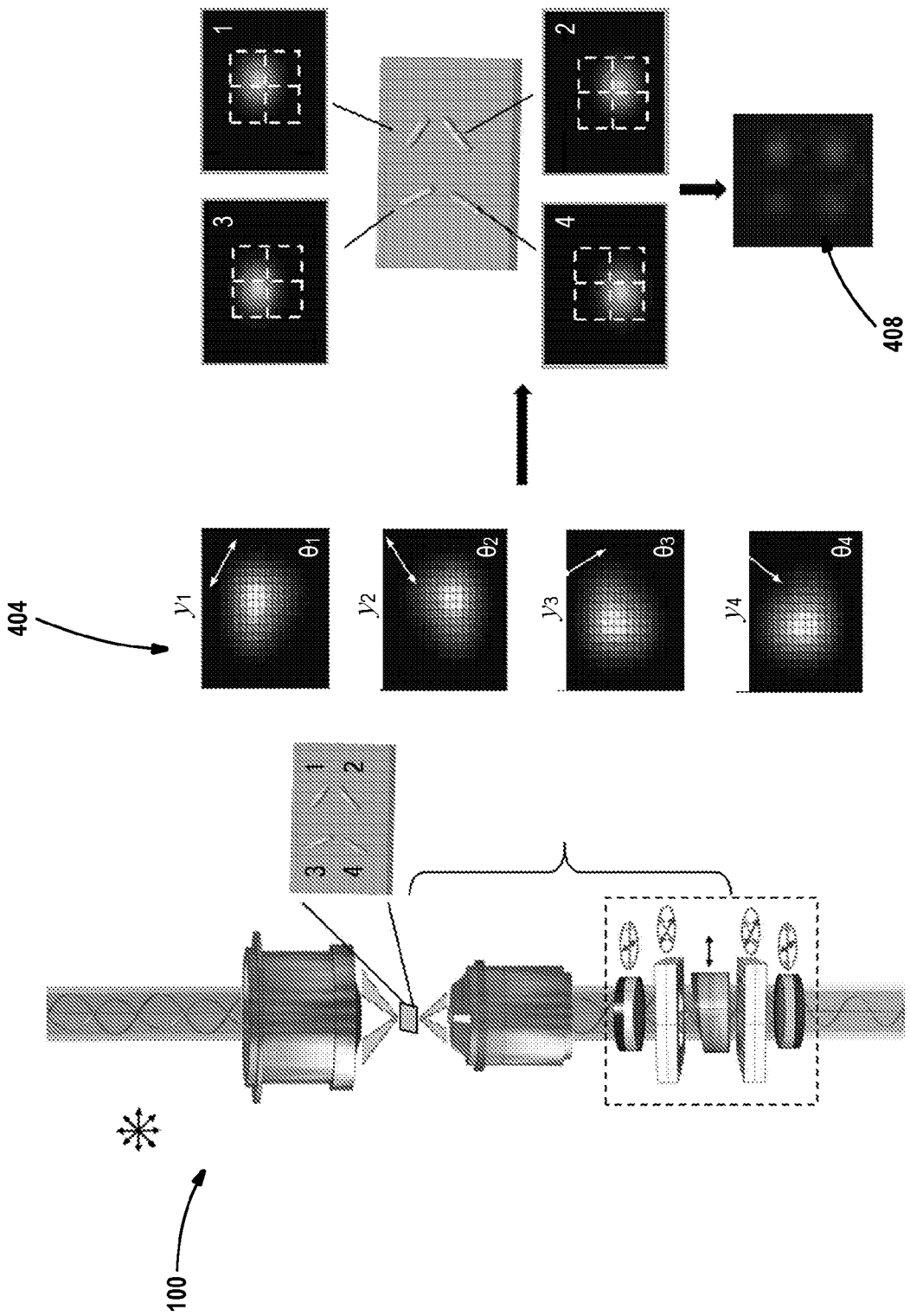
FIG. 4 is a depiction of diffraction-limited analyzed images and a reconstructed final image.

Referring now to FIG. 4, a depiction of diffraction-limited analyzed images 404 and a reconstructed final image 408 is shown. Sub-diffraction reconstruction imaging enabled via plasmonic polarization captures a set of original images using the microscope. Each captured original image corresponds to a different voltage, which is being varied using the voltage-tunable polarizer 104. Varying the voltage via the voltage-tunable polarization 104, modulates the polarization-sensitive scatterers. This modulation results in the scatterers varying in intensity where a highest intensity of a scatterer is visualized when the scatterer is aligned with the polarization corresponding to the voltage the voltage-tunable polarizer 104 is set.

In this way, the polarization state of light interacting with (or scattered from) the polarization-sensitive scatterers are modulated by the voltage-tunable polarizer 104, resulting in different far-field, original images, which are analyzed to generate the analyzed images 404, as shown in images $y_1$ to $y_4$, containing polarization information of the scatterers at optimal voltage modulation. For example, a reconstruction algorithm analyzes the original set of images captured by the microscope using the voltage-tunable polarizer 104 at different voltages. Then, to generate the analyzed images 404, the reconstruction algorithm analyzes the original images to find in which images particles are at a highest intensity, indicating alignment at the corresponding voltage, performing a small field-of-view particle analysis.

The reconstruction algorithm analyzes the original images to enhance the resolution of each pixel of the image during a large field-of-view analysis, described below, as well as analyze each particle included in the analyzed images 404 during the small field-of-view analysis. The reconstruction algorithm utilizes the voltage modulation, polarization, and intensity information to back calculate (analytically and/or numerically) the original images of single scatterers to obtain the sub-diffraction final image 408. As a comparison, diffraction-limited images without voltage-tunable polarizers do not contain polarization information and, therefore, cannot achieve sub-diffraction resolution. In addition to polarization, modulation of amplitude and phase using spatial light modulators can be also used to break the diffraction limit.

Small Field-of-View Reconstruction of Sub-Diffraction Non-Bleaching Scatterers

The small field-of-view reconstruction of the polarization-sensitive scatterers relies on capturing the diffraction-limited images of the scatterers under different transmission polarization directions, as shown in FIG. 4. In various implementations, the small field-of-view reconstruction may be performed on a set of original images after a large field-of-view reconstruction method is applied to the original set of images. The large field-of-view reconstruction method is applied to the original set of images to attempt to remove or reduce blurring of the images. Additionally implementation details regarding the large field-of-view reconstruction method are discussed in the subsequent section.

Returning to the small field-of-view reconstruction method, for illustration purpose, it is assumed that there are four scatterers within an area below diffraction limit, labelled 1, 2, 3 and 4. When changing the transmission polarization using voltage, individual scatterers exhibit different intensities based on their orientations ($\theta_1$, $\theta_2$, $\theta_3$, $\theta_4$). When polarization direction ($\alpha$) is aligned with the first scatterer, it will be at its brightest state ($I_{01}$). Meanwhile, the second scatterer ($\theta_1$) will exhibit an intensity level of $I_{02}*\cos^2(\theta_1-\theta_2)$, where $I_{02}$ is the maximum intensity of the second particle. By expanding the above relationship to all four scatterers, the polarization imaging taken at n distinct directions can be expressed as follows:

$$\begin{bmatrix} A_{11} & A_{12} & \ldots & A_{14} \\ A_{21} & A_{22} & \ldots & A_{24} \\ \ldots & \ldots & \ldots & \ldots \\ A_{n1} & A_{n2} & \ldots & A_{n2} \end{bmatrix} \begin{bmatrix} x_1 \\ x_2 \\ x_3 \\ x_4 \end{bmatrix} = \begin{bmatrix} y_1 \\ y_2 \\ \ldots \\ y_n \end{bmatrix}, \quad (1)$$

$$\begin{cases} A_{11} = \cos^2(\theta_1 - \alpha_1) \\ A_{12} = \cos^2(\theta_2 - \alpha_1) \\ \ldots \\ A_{21} = \cos^2(\theta_1 - \alpha_2), \\ A_{22} = \cos^2(\theta_2 - \alpha_2) \\ \ldots \\ A_{n4} = \cos^2(\theta_4 - \alpha_n) \end{cases} \quad (2)$$

where $\alpha$ is the current transmission polarization direction, $x_1$ through $x_4$ are the single scatterer images when the transmission polarization direction is fully aligned with their corresponding orientations, and $y_1$ through $y_n$ are the diffraction limited images obtained from the imaging system. By solving Equation 1 for x, the single particle images, labelled as 1, 2, 3, and 4 respectively, can be calculated, resulting in the spatial locations of scatterers within sub-diffraction distance.

In various implementations, only four equations are needed and used to solve for four scatterers. However, more images can be taken at different polarization directions to improve accuracy. When matrix A becomes a tall matrix including many images, numerical and/or analytical methods such as simple matrix inverse, QR algorithm, single value decomposition (SVD), and gradient descent can be implemented to solve for x. Among the numerical methods, QR and SVD are more computational efficient. However, noise and distortion of the A values and measured y are often not avoidable during actual imaging as a result of various CCD noise, random vibration of the platform, and other optical system imperfection. Therefore, Equation 1 may not have an analytical solution. In such a case, a solution that satisfies the following relationship can be obtained:

$$\text{Reconstructed images} = \min (A \times x - y) \quad (3)$$

Numerical methods such as gradient descent or projected gradient descent may be implemented to solve Equation 3 as such methods allow for boundaries to be set about the solution. Equations 1-3 can be further expanded for more scatterers by adding more variables ($x_5$ to $x_n$).

Figure 5:
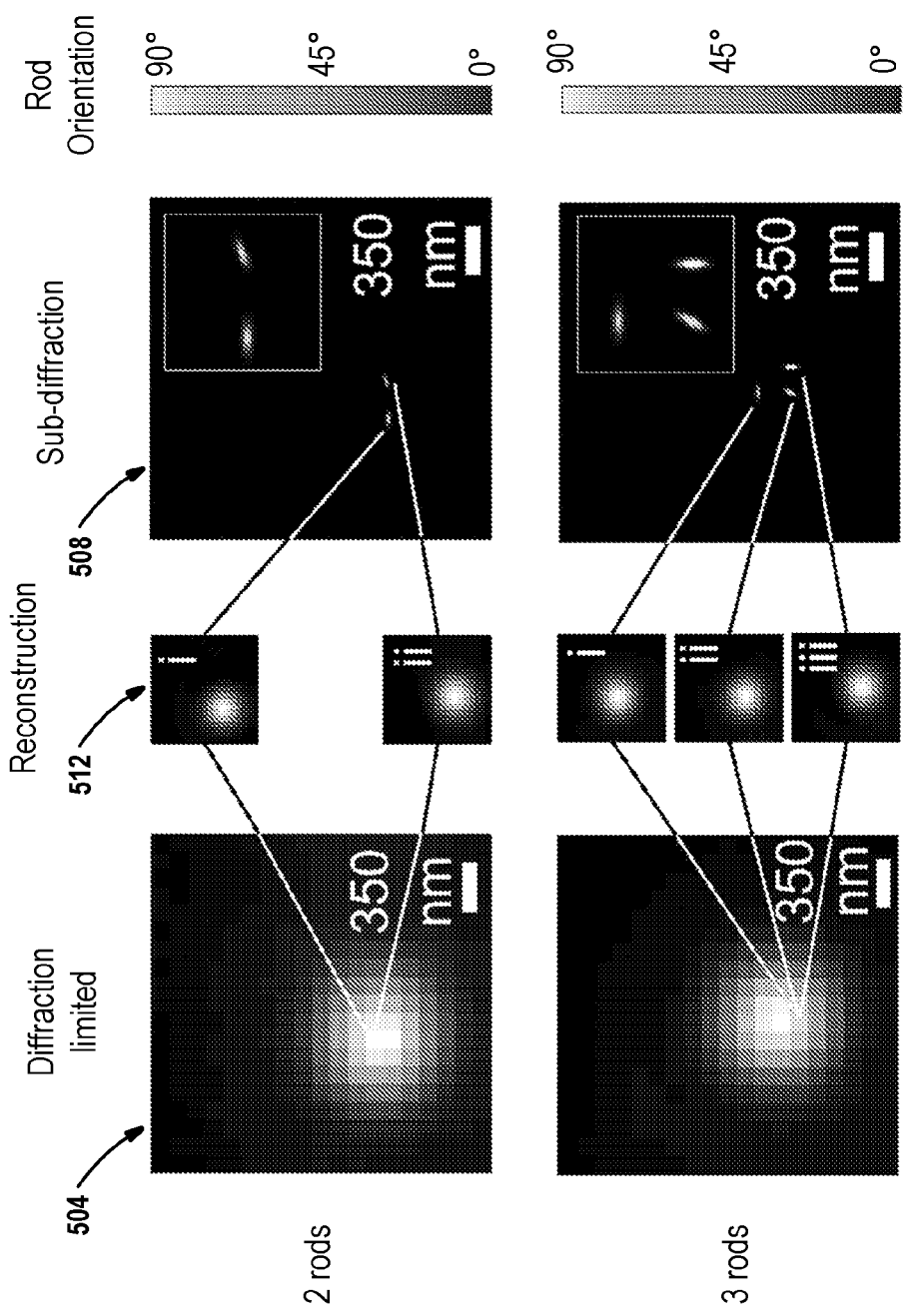
FIG. 5 is an example progression of images depicting original images that are diffraction limited and a final image after application of an image reconstruction algorithm producing sub-diffraction images for two scatterers and three scatterers.

As an example for the reconstruction algorithm, FIG. 5 illustrates the reconstruction of polarization-sensitive scatterers below the diffraction limit. Specifically, FIG. 5 depicts original images that are diffraction limited 504 and a final image 508 after application of an image reconstruction algorithm produces intermediate images 512 producing sub-diffraction final images 508. For example, the top images depicting two scatterers show reconstruction of a cluster consisting of the two scatterers with inter-particle distance of approximately 270 nm. Additionally, the bottom images depicting three scatterers show reconstruction of a cluster consisting of the three scatterers with inter-particle distance of approximately 200 nm.

The intermediate images 512, labelled as i and ii for the top images and i, ii, and iii for the bottom images, are calculated solutions representing the images of single scatterers. It can be seen that, in both cases, the algorithm was able to accurately obtain the solution for Equation 1 and fit them with a distribution function to locate the position of all individual scatterers.

Large Field-of-View Reconstruction of Sub-Diffraction Non-Bleaching Scatterers

Figure 6:
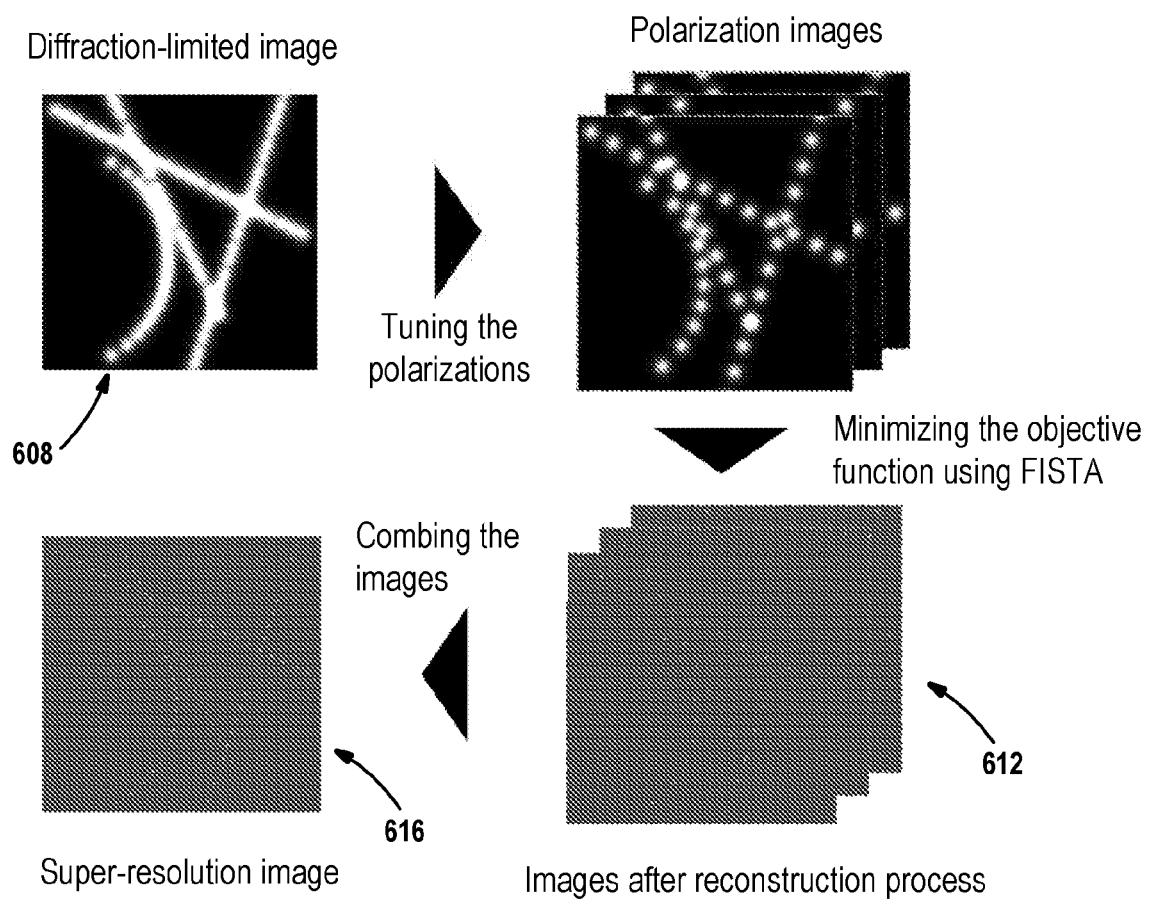
FIG. 6 is an example flow diagram depicting a large field of view reconstruction method.

The large field-of-view reconstruction method is used for processing sub-diffraction scatterers with high population density. Similar to the small field-of-view method, a set of polarization images are first taken by tuning the transmission polarization directions using the voltage-tunable polarizer. FIG. 6 is an example flow diagram depicting a large field-of-view reconstruction method. The large field-of-view reconstruction method relies on acquiring multi-frame original images 604 of polarization-sensitive non-bleaching nano-scatterers under different polarization directions. A reference image 608 may be the first image of the original images, which is the viewed image without conducting large field-of-view reconstruction. For each frame of the original images 604, the intensity distribution of the nano-scatterers is obtained by minimizing the objective function using a fast-iterative shrinkage-thresholding algorithm (FISTA), producing intermediate images 612.

That is, after acquisition of these polarization images (or original images 604), a deconvolution-based algorithm is used for large field-of-view reconstruction. In various implementation, alternative algorithms may be used for large field-of-view reconstructions. For each frame of the original images 604, the acquired image ($y_i$) can be expressed as a Poisson distribution of the photons reaching the CCD (u(x, b)):

$$\begin{cases} y_i \sim Pois(u(x_i, b_i)) \\ u(x_i, b_i) = h \otimes x_i + b_i \end{cases}, \quad (4)$$

where h is the instrument's PSF, $b_i$ is the background noise, and $x_i$ is the intensity distribution of the nano-scatterers. To resolve these nano-scatterers, the reconstruction process is then performed by solving the optimization problem of minimizing the following objective function with L1 regulation:

$$\operatorname*{argmin}_{x,b}\left\{\sum u(x_i, b_i) - y_i \cdot \log(u(x_i, b_i)) + \lambda_1 \|x_i\|_1 + \lambda_2 \|b_i\|_1\right\}, \quad (5)$$

where the last two terms are regularization terms to avoid overfitting. The $\|\ \|_1$ represents the L1-norm operator, $\lambda_1$ and $\lambda_2$ are regulation parameters. By applying the FISTA, the reconstruction result of the nano-scatterers' intensity distribution ($x_i$) in each frame can be obtained from Equation 5. The output super-resolution image 616 (x) is the combination of the reconstruction result from all the polarization images acquired (original images 604) and can be expressed as:

$$x = \Sigma x_i \quad (6)$$

Figure 7A:
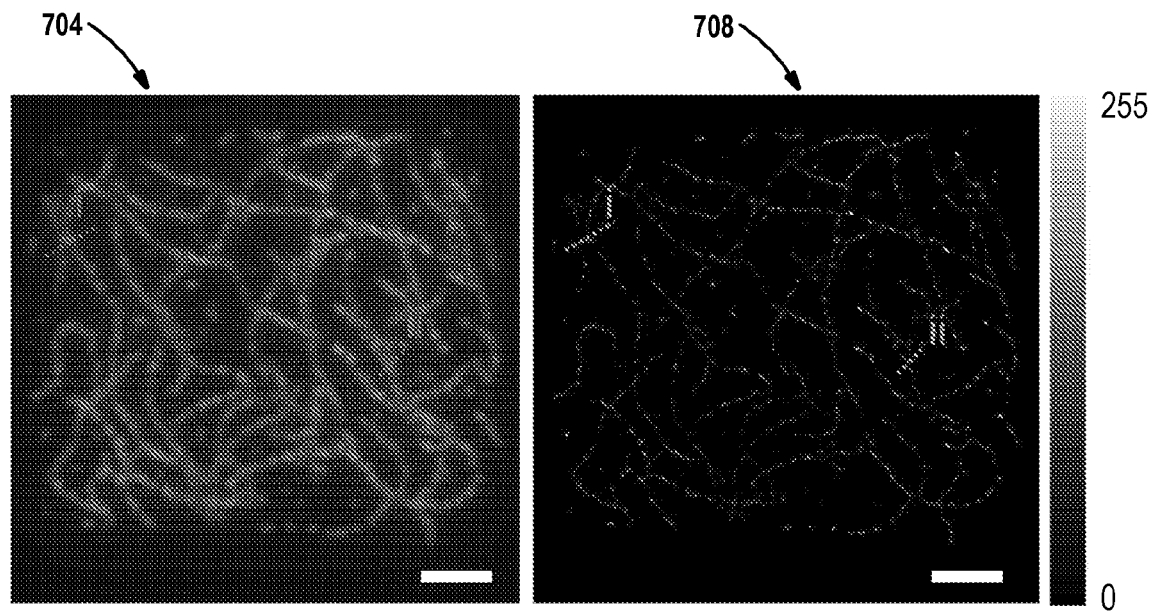
FIG. 7A shows an example diffraction limited, original image and a reconstructed final image.
Figure 7B:
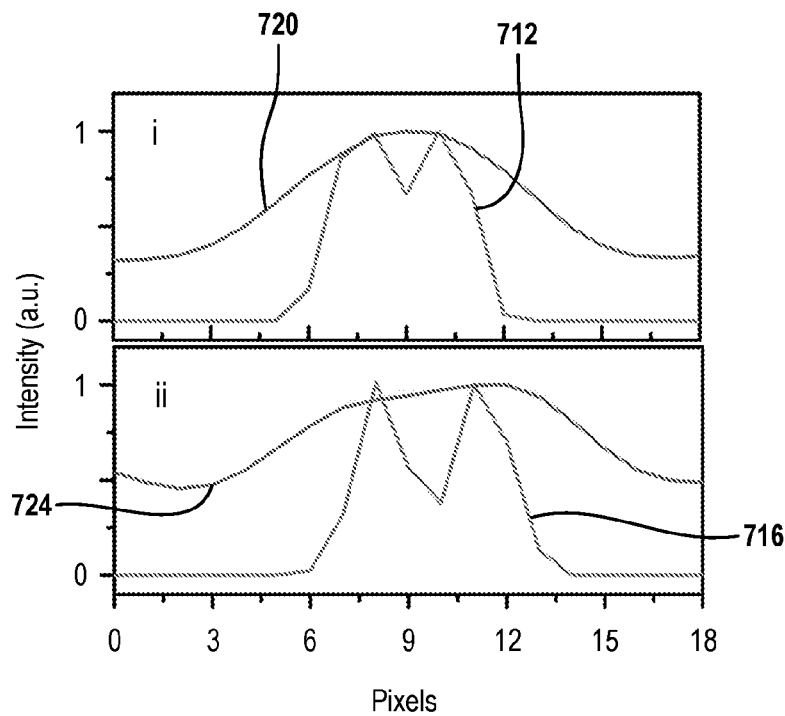
FIG. 7B shows graphical depictions of intensity profiles between adjacent nano-scatterers.

In various implementations, a combination of the small field-of-view reconstruction and the large field-of-view reconstruction may be implemented on a set of original images, as is discussed below. By using the large field-of-view reconstruction method, high-density samples of non-bleaching nano-scatterers in a large area are resolved. To verify this, FIGS. 7A-7B show the experimental results of original images 704 and reconstruction images 708 of nano-scatterers patterned filaments with high density. For example, FIG. 7A shows an example diffraction limited, original image 704 and the reconstructed (final) image 708. The super-resolution image 708 of a high-density sample can be obtained by using large field-of-view reconstruction method. The scale bar in FIG. 7A is 5 μm.

Further, FIG. 7B shows graphical depictions of intensity profiles between adjacent nano-scatterers. The intensity profiles of FIG. 7B are extracted from the dotted lines (i and ii in FIG. 7A), indicating a sub-diffraction resolving distance of approximately two pixels (~260 nm, 0.34λ) between adjacent nano-scatterers. The intensity profiles extracted from the dotted-lines (i & ii) in the diffraction-limited original image 704 are shown by a first line 712 and a second line 716. The intensity profiles extracted from the dotted-lines (i & ii) in the super-resolution reconstructed image 708 are shown by a third line 720 and a fourth line 724. The pixel size is approximately 120 nm.

Due to the increase in resolution, the structure of filaments can be clearly uncovered after the reconstruction. Meanwhile, a significant enhancement in signal-to-noise ratio can also be observed due to the removal of the background and noise (b) through the reconstruction process.

As mentioned previously, once large field-of-view reconstruction is performed on a set of original images, the resolution of intermediate images may be determined by comparing these intermediate images (that large field-of-view reconstruction has been performed on) to the original images. If the large field-of-view analyzed images or intermediate images are not different beyond a predetermined threshold, then the reconstruction method of the present application may further perform the small field-of-view reconstruction method on each particle or object included in the original images to generate the final image depicting each particle or object with a highest intensity value (e.g., the best quality image of the particle from the set of original images) by selecting the highest intensity value particle from the set of original images and generating the final image combining the highest intensity image of each particle or object.

Non-Bleaching Super Resolution Optimization

Due to the non-homogeneous nature of images, non-bleaching super-resolution images may contain areas that may be more efficiently reconstructed using different algorithms. Non-bleaching super-resolution can be optimized by reconstructing images using multiple algorithms (e.g., small field-of-view algorithm and large field-of-view algorithm), determining reconstruction accuracy for each area in an image, and finally producing a final, combined image in which each area in the image is reconstructed using the algorithm with the highest accuracy.

Figure 8:
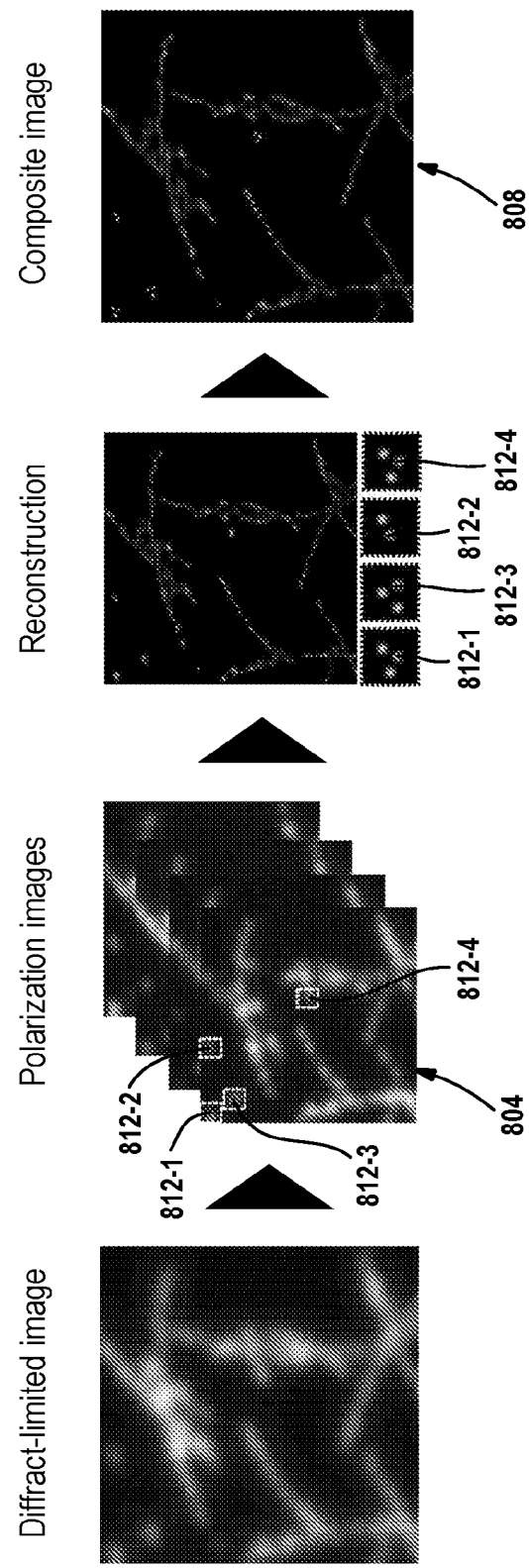
FIG. 8 is an example flow diagram depicting a reconstructed final image including a combination of a large and a small field-of-view reconstruction method.

The small field-of-view and large field-of-view reconstruction methods both rely on acquiring multi-frame images 804 of polarization-sensitive non-bleaching nano-scatterers under different polarization directions. Referring to FIG. 8, an example flow diagram depicting a reconstructed composite image 808 implementing a combination of a large field-of-view and a small field-of-view reconstruction method is shown. Implementing a combination of both methods results in a highest quality of super-resolution. For each frame, the spatial sparsity created by the polarization modulation is utilized by both methods to obtain the super-resolution image. The large field-of-view method uses the deconvolution-based algorithm to directly recover the whole image from the blurring caused by the instrument's point spread function (PSF), which allows the reconstruction of the super-resolution composite image, reconstructed from a relatively high density of non-bleaching nano-scatterers (n number of scatters).

Meanwhile, for a specific region of interest 812 (e.g., dashed-line box in FIG. 8), the small field-of-view method can be used to localize individual nano-scatterers (e.g., on a particle-by-particle basis) by analyzing their intensity variations due to the polarization modulation, enabling a high spatial precision and accuracy on the deep subwavelength level (0.18±0.02λ). By combining these two methods in the reconstruction process, we are able to resolve high-density sample of non-bleaching nano-scatterers in a large area without compromising the spatial precision and accuracy of reconstruction.

Figure 9:
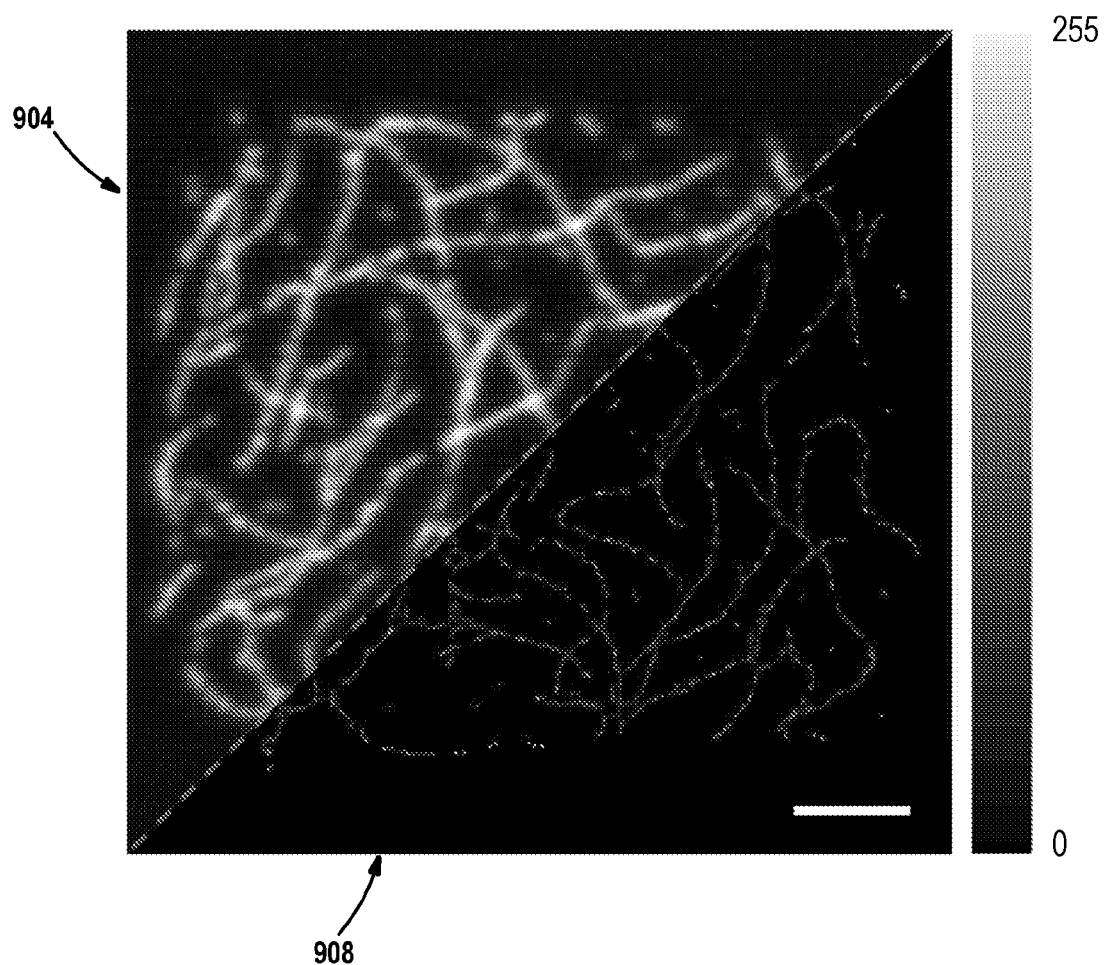
FIG. 9 is an image depicting a diffraction-limited image of a simulated pattered filament and a super-resolution image of a simulated patterned filament.

FIG. 9 is an image depicting a diffraction-limited image 904 of a simulated pattered filament and a super-resolution image 908 of a simulated patterned filament, with a scale bar of 5 μm. By seamless fusion of these two methods, the resolution of the whole image is dramatically improved due to the large field-of-view deconvolution, enabling clear visualization of the morphology of the complex filament networks. Additionally, for short filaments of specific interest, small field-of-view reconstruction offers the ability to uncover spatial details of every individual nano-scatterers or particle along the filament.

Non-Bleaching Long-Term Super Resolution Imaging

Previous super-resolution techniques require fluorophores for sample labeling. Each fluorophore has a fixed number of activation and deactivation cycles before irreversibly photobleaching, limiting the observation window in the time domain and thus hindering its applications in long-term imaging. To address this issue, the present image reconstruction method or super-resolution method uses a non-bleaching strategy to resolve polarization-sensitive non-bleaching nano-scatterers under polarization modulation.

Figure 10A:
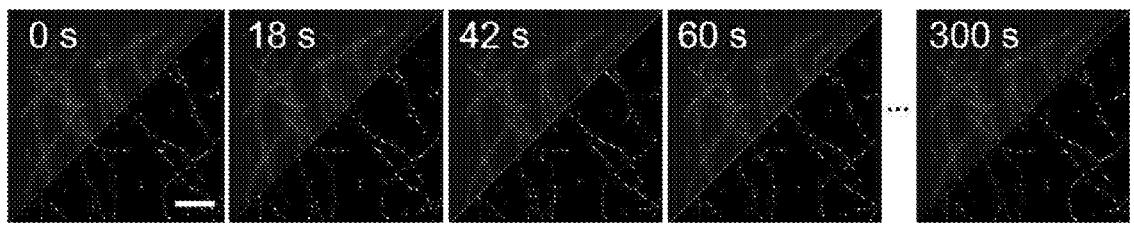
FIG. 10A is a time series of images depicting nano-scatterers patterned filaments.

Due to the photostability of the nano-scatterers, the observation windows can be extended to multiple weeks, which fully meet the requirement for long-term biology studies. To demonstrate such long-term imaging capability of this method, FIG. 10A depicts a time series of images of nano-scatterers patterned filaments, FIG. 10B depicts a time series of images of fluorescent labelled actin filaments processed using large field-of-view reconstruction, and FIG. 10C depicts an intensity stability of nano-scatterers and fluorophore over time.

Figure 10B:
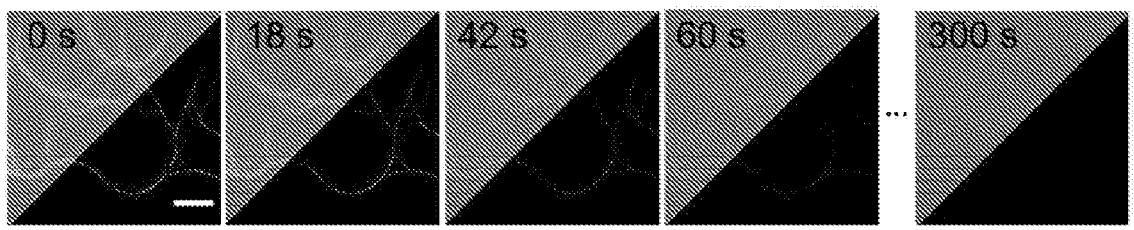
FIG. 10B is a time series of images depicting fluorescent labelled actin filaments processed using large field-of-view reconstruction.

For the fluorescent labelled actin filaments of FIG. 10B, the intensity drops over time, leading to a decreasing signal-to-noise ratio. Consequently, the precision and accuracy of the reconstruction result were degraded with a longer observation window. Finally, at 300 seconds in FIG. 10B, complete photobleaching of the fluorescent labelled actin occurs, making reconstruction impossible. Conversely, the non-bleaching nano-scatterers patterned filaments in FIG. 10A exhibit stable intensity over the whole observation window and the precision and accuracy of the reconstruction result are thus guaranteed.

Figure 10C:
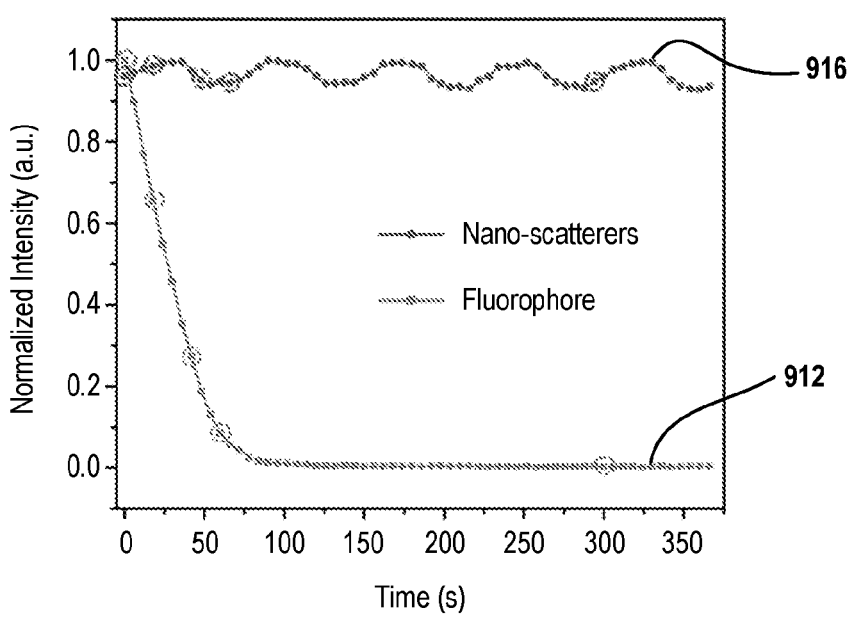
FIG. 10C is a graphical depiction of intensity stability of nano-scatterers and fluorophore over time.

For quantitative analysis, time-dependent intensity relations for both methods are calculated and shown in FIG. 10C. Unlike that of the fluorescent labelled actin, in which the intensity drops by 90% and becomes irreversibly photobleached after 300 seconds (shown in a fluorescent line 912), the non-bleaching nano-scatterers patterned actin (shown in a non-bleaching line 916) maintains a stable intensity with less than 6% variation. Note that, such intensity variation is only because the illumination is not fully non-polarized, and the illumination intensity slightly varies with different polarization directions.

Encoding and Decoding by Emergent Uniqueness and Sub-Wavelength Disorder of Scatterers An encoding and decoding method utilizes sub-wavelength disorder for high-density (sub-diffraction) encoding and decoding. Unlike traditional pigments or dyes, scatterers are free from photo-bleaching, blinking, and fading as described and investigated above. Exploiting sub-wavelength disorder for encoding and decoding, patterned and tunable scatterers within a diffraction-limited area are proposed for information storage, general consumer goods, originality validation, tampering detection, and/or encoding/encryption tagging. This encoding and decoding method is compatible with hard and/or flexible substrates, skins, and thin films.

Emergent patterns in nature, such as those on beetle elytra, animal coats, and human skin, exhibit remarkable individuality. Self-organization has been proffered as one key principle of emergent patterns in which simple constituent units spontaneously organize (emerge) into group-level patterns. Such organization is governed by a set of rules iterated among the constituent units. Firstly, each constituent unit in a pattern reacts with (activates) its adjacent neighboring units (i.e., short-range activation). Secondly, each unit in the pattern annihilates (inhibits) distant units independent of a unit's initial state (i.e., long-range inhibition). These rules are iterated until a final pattern emerges. Emergent patterns have inspired applications in a broad range of research areas, ranging from biology and medicine to chemistry and material science to physics and engineering to computer science.

As self-organization is spontaneous in nature, emergent patterns are inherently unique. Emergent patterns on various animal coats are recognized to be unique to individuals. However, uniqueness, another key principle of emergent patterns, is not so well characterized or understood. This is because there lacks established metrics for determining the uniqueness of emergent patterns. Therefore, defining a set of rules for describing uniqueness of emergent patterns and metrics for quantifying uniqueness of emergent patterns is developed to identify such uniqueness. Since emergent patterns adhere to a general theme, a similarity metric may be used to quantify uniqueness. Additionally, emergent patterns that adhere to a general theme also exhibit variations that can be quantified by a sensitivity metric.

When comparing the similarity and sensitivity metrics of patterns, the odds of two emergent patterns in nature being the same is one in several billion. Inspired by emergent patterns in nature, emergent uniqueness may be used for encoding a unique pattern.

Further, the accessible number of codes can be dramatically expanded by exploiting emergent uniqueness. To implement encoding of emergent patterns, artificial emergent patterns are designed according to similarity and sensitivity metrics. This designing shows the odds of two artificial emergent patterns being the same is one in several billion. Such practically unlimited encoding capacity enabled by emergent uniqueness broadens the range of practical industrial applications, including covert encoding, originality validation, and tampering detection in pharmaceuticals, electronics, forensics, and monetary anti-counterfeiting.

The encoding/decoding process is enabled by the sub-diffraction reconstruction. Information of interest is associated with the specific locations and orientations of polarization-sensitive proximal scatterers that are below the diffraction limit. Since the placement of these scatterers are below the diffraction limit following certain rules that dictates their locations and orientations, it is not possible to visualize these scatterers and obtain the information with any existing far-field imaging methods. As an example, a block 1104 consisting of 16 diffraction-limited spots is put through a reconstruction process. After reconstruction, each diffraction-limited spot is transformed up to four single scatterer images. The encoded information is then obtained by grouping images of scatterers of the same orientations into four different quadrants 1108 with a certain order.

To make the sub-diffraction encoding and decoding process applicable and scalable for high volume of information, five different building blocks may be standardized to represent five grayscale levels (or five information density levels). Within each building block, there are up to 16 diffraction-limited spots within which up to four scatterers are placed below the diffraction limit. The exact number and positions of the scatterers are obtained using the decoding process to reveal the hidden information. This information is verifiable through methods such as scanning electron microscopy.

With the help of standardized building blocks, the encoding and decoding process with the assistance of sub-diffraction reconstruction can be further applied in a large scale where distinct information can be hidden inside patterns that possess identical appearance in the far-field. Different information are encoded into different patterns. For each diffraction-limited spot, the number of scatterers for different patterns are the same, resulting in a similar intensity level when imaged at far-field using un-polarized light. However, the exact positions of scatterers of a particular orientation are different, as a result of different information being encoded. After decoding, the sub-diffraction patterns of the different patterns exhibit completely different appearances, representing different information. Finally, incorporation of tunable scatterers allow for information to be readily encoded and re-encoded.

Programmed Encoding

Programmed encoding assigns scatterers orientations randomly. However, multiple scatterers proximate to one another may have the same orientation. For such areas, a manual encoding method can be used after programmed encoding is performed to adjust manually the assigned orientations to be different from each other.

Specifically, after the random assignment of the scatterers orientations in a programmed encoding process, the assigned orientations within a small area around each scatterer may be examined. If two or more scatterers within this small area have the same or similar orientations, for example, below a threshold value, then this small area is marked to be encoded again during the manual encoding method, described in more detail below.

Artificial emergent patterns are introduced such that no two artificial emergent patterns are the same. Artificial emergent patterns are generated using a programmed encoding method, shown in FIG. 11. In this case, the generated emergent patterns serves as the location basis for placing the scatterers to form the encoded information. To generate the artificial emergent pattern, first a set of parameters (variables 1 through 4) are determined to form an emergent model, such as cellular automata. The determination of this set of parameters is aided by two quantitative uniqueness metrics: similarity and sensitivity, shown as the red and blue maps in the figure. The first metric, similarity, measures how similar two patterns are with respect to each other. The second metric, sensitivity, measures how sensitive a pattern is to initial small perturbations, which is an indicator of the complexity level of the model and the variations of the patterns.

Figure 11:
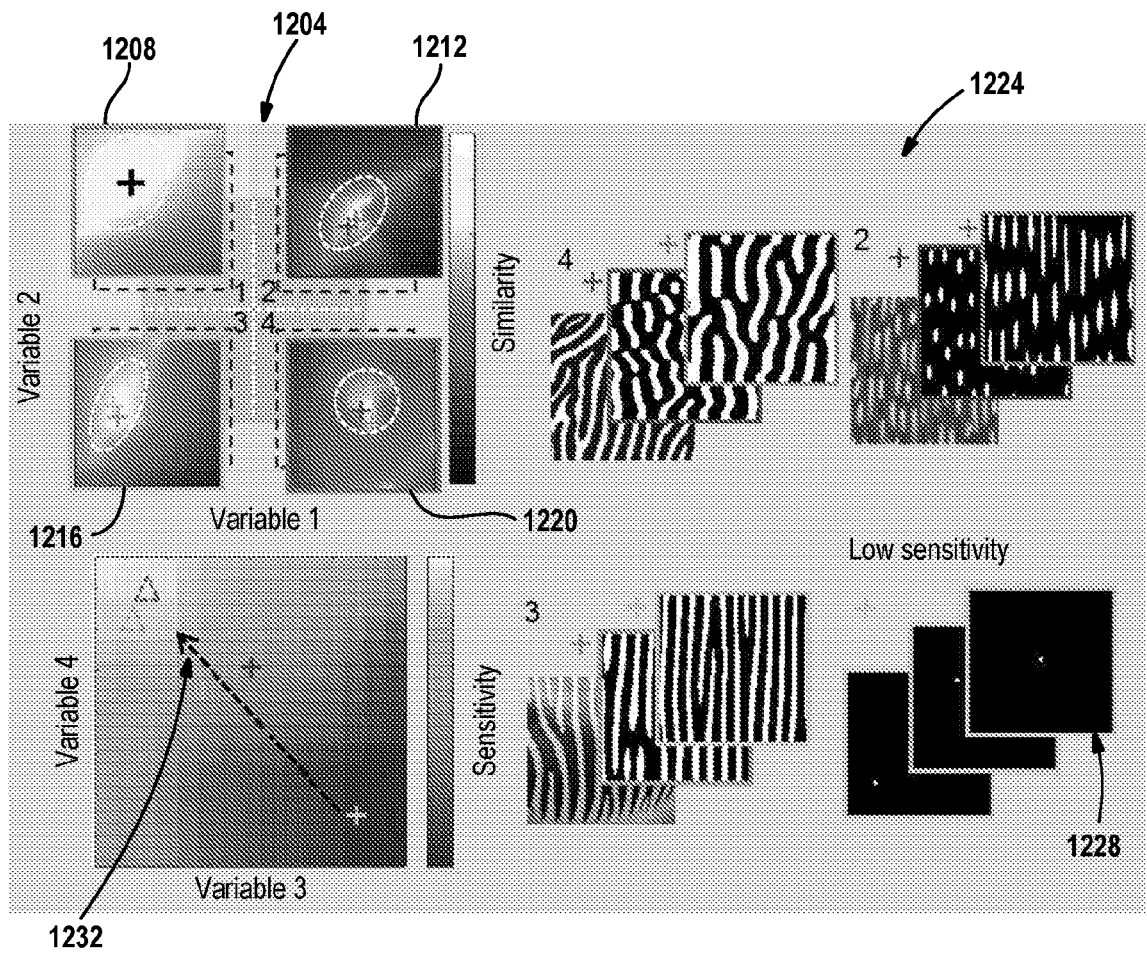
FIG. 11 is an illustration of a similarity map implemented during programmed encoding of an image.

FIG. 11 is an illustration of a similarity map that is partitioned into four sections 1204 (i through iv), showing the similarity within different themes of patterns across a large parameter space. Section i 1208 depicts the parameters used for generating the encoded patterns (black cross, see FIG. 12 for additional details). Section ii 1212 depicts the parameters for the emergent patterns of beetle elytra. Section iii 1216 depicts the parameters for the emergent patterns of zebra stripes. Section iv 1220 depicts the parameters for the emergent pattern of visual cortex of monkeys. The sensitivity map 1224 selectively shows the sensitivity and thus complexity levels of the patterns in section ii, iii and iv. In addition, a low sensitivity 1228 example is shown in the lower right corner, which is to be avoided for encoding. An arrow 1232 indicates the direction along which the sensitivity increases. In general, encoding emergent pattern parameters are selected to be of high sensitivity and high similarity (black cross). The similarity and sensitivity levels can be tuned based on factors such as encoding density and decoding accuracy requirement.

Figure 12:
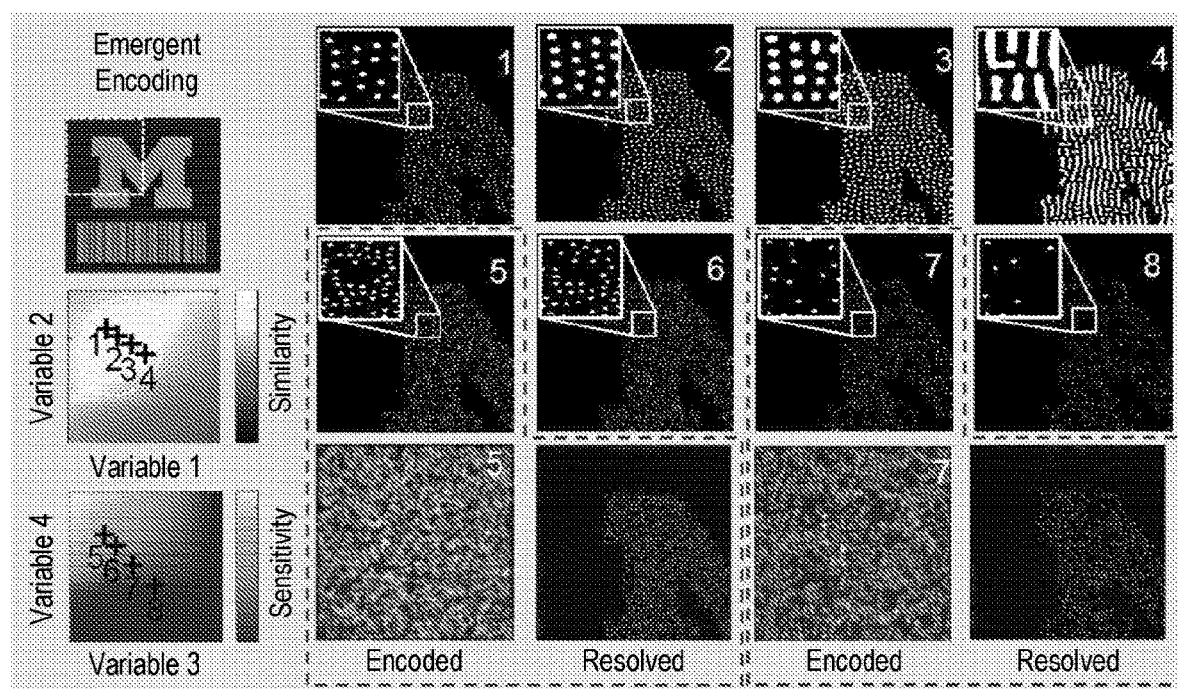
FIG. 12 is an illustration of eight different emergent patterns developed from parameter spaces during programmed encoding of an image.

Programmable encoding enables unique artificial emergent patterns. FIG. 12 illustrates eight different emergent patterns developed from parameter spaces selected based on the principles described above. The similarity metric mentioned previously may be calculated based on a distance transformation algorithm. Emergent pattern images are first converted to binary images A and B, with feature area indicated by 1 and empty areas indicated by 0. Then for each image, the distance transformation (A' and B') is calculated at each pixel to be the distance of the pixel to its nearest feature. Thus A, B, A', and B' are matrices of same dimension to the original images. The similarity is then calculated to be the average of sum of the overlap between one pattern and the distance transformation of another pattern, as shown in Equation 7, below:

$$\text{Similarity} = \frac{\sum (A * B') + \sum (A' * B)}{N}. \quad (7)$$

Here * is the element-wise product and N is the total number of pixels. The similarity map is numerically calculated at each point, for the patterns generated by the range of Variable 1 and Variable 2 parameters. To calculate sensitivity ($\mu$), two consecutive patterns ($P_1$ and $P_2$) during the development of an emergent pattern of a set of parameters (Variable 3 and Variable 4) are selected (think of $P_1$ and $P_2$ as the temporary patterns during the emergent process). In various implementations, alternative algorithms may be used to determine a similarity metric between patterns.

First, for each pixel $S_{j,i}$ at location (j,i) in $P_2$, a neighborhood $\eta$ is determined in $P_1$ (generated by a cellular automata). This neighborhood determines the pixel value of $S_{j,i}$ (This is how $P_1$ evolves into $P_2$).The neighbor of the pixel $S_{j,i}$ consists of all pixels within a certain radius r of the pixel (j,i) determined by Variable 3 and Variable 4. Now an operation $$\frac{\delta \phi}{\delta S_{j,i}}$$

is defined such that, if a value change of a pixel inside the neighbor $\eta$ results in the value change of $S_{j,i}$, then $$\frac{\delta \phi(\eta(S_{j,i}))}{\delta S_{j,i}} = 1,$$

otherwise, $$\frac{\delta \phi(\eta(S_{j,i}))}{\delta S_{j,i}} = 0.$$

Second, this operation $$\frac{\delta \phi}{\delta S_{j,i}}$$

is summed over all pixels within the neighborhood and over all possible neighborhoods within the pattern $P_2$ (i.e. all possible $S_{j,i}$) to obtain the sensitivity value. The sensitivity value is normalized with a normalization factor M, which is related to the pattern area.

The above calculation is represented in Equation 8 below.

$$\mu = \frac{1}{M} \sum_{\forall \eta} \sum_{j=1}^{2r+1} \sum_{i=1}^{2r+1} \frac{\delta \phi(\eta(S_{j,i}))}{\delta S_{j,i}}. \quad (8)$$

In various implementations, alternative algorithms may be used to determine a sensitivity metrics of pattern types. Referring now to FIG. 12, a letter M is the information to be encoded with the emergent pattern. A portion of the letter M is shown in details as depicted in patterns 1 through 8. Patterns 1 through 4 show the effect of decreasing similarity with pattern 1 being the reference pattern. It can be seen that as variable 1 and variable 2 changes from pattern 1 to 4, the emergent pattern morphology changes with overall larger feature (for example, "patches" versus "dots") areas and fewer isolated features. This also results in a lower encoding density. Patterns 5 through 8 depict the effect of decreasing sensitivity in the emergent model. It can be seen that tuning variables 3 and 4 towards lower sensitivity (opposite direction of the arrow) will also lead to a sparser pattern and a lower encoding density. Additionally, both similarity and sensitivity tuning will affect the locations of the features, which further aids the creation of unique encoded patterns.

The third row of FIG. 12 depicts two examples of the encoded patterns using patterns 5 and 7 as a parameter set. The encoded pattern is optically unidentifiable under normal illumination. After resolving the patterns using the sub-diffraction/super-resolution imaging method described previously, the encoded information is revealed. In this case, after resolving, the two patterns and the locations of individual scatterers are visibly discernible. As can be discerned, no two artificial emergent patterns are the same.

Manual Encoding

Manual encoding relies on assigning scatterer orientations from a limited selection of available orientations with guaranteed angle separations. The selection is such that one orientation will only occur once during the selection process. As a result, there is no duplication among proximity scatterers. This ensures the quality of the decoding since such duplications will lower the overall decoding accuracy because of decreased sparsity.

Manual encoding can be used to create complex artificial patterns. The manual encoding ensures that all scatterers in proximity have different orientations. However, manual encoding is slow. To overcome this limitation, programmed encoding is used for high speed combined with manual encoding for best accuracy.

Figure 13:
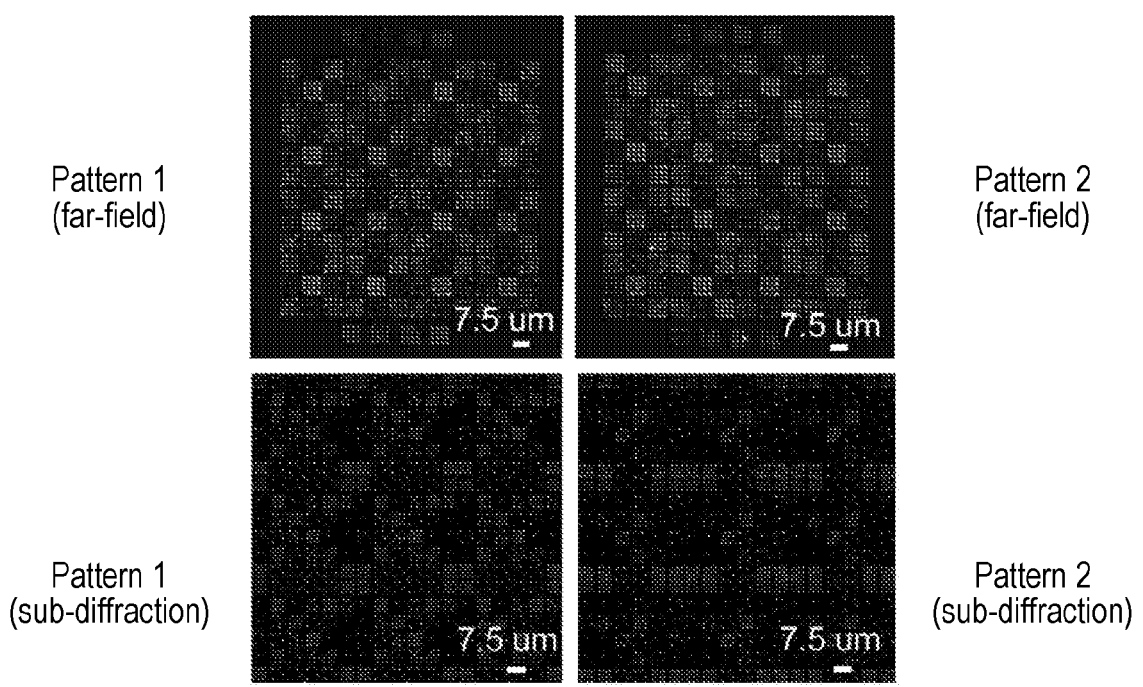
FIG. 13 is an illustration of patterns resulting from manual encoding of an image.

FIG. 13 is an illustration of patterns made purely using manual encoding. Visually identical far-field patterns are decoded into unique sub-diffraction patterns. Pattern 1 and pattern 2 are not distinguishable from the far-field. However due to the difference between their stored information, the decoded sub-diffraction patterns can be easily distinguished. In the event multiple scatterers in proximity have the same orientation after programmed encoding, manual encoding is implemented to adjust manually the assigned orientations to be different from each other.

Figure 14:
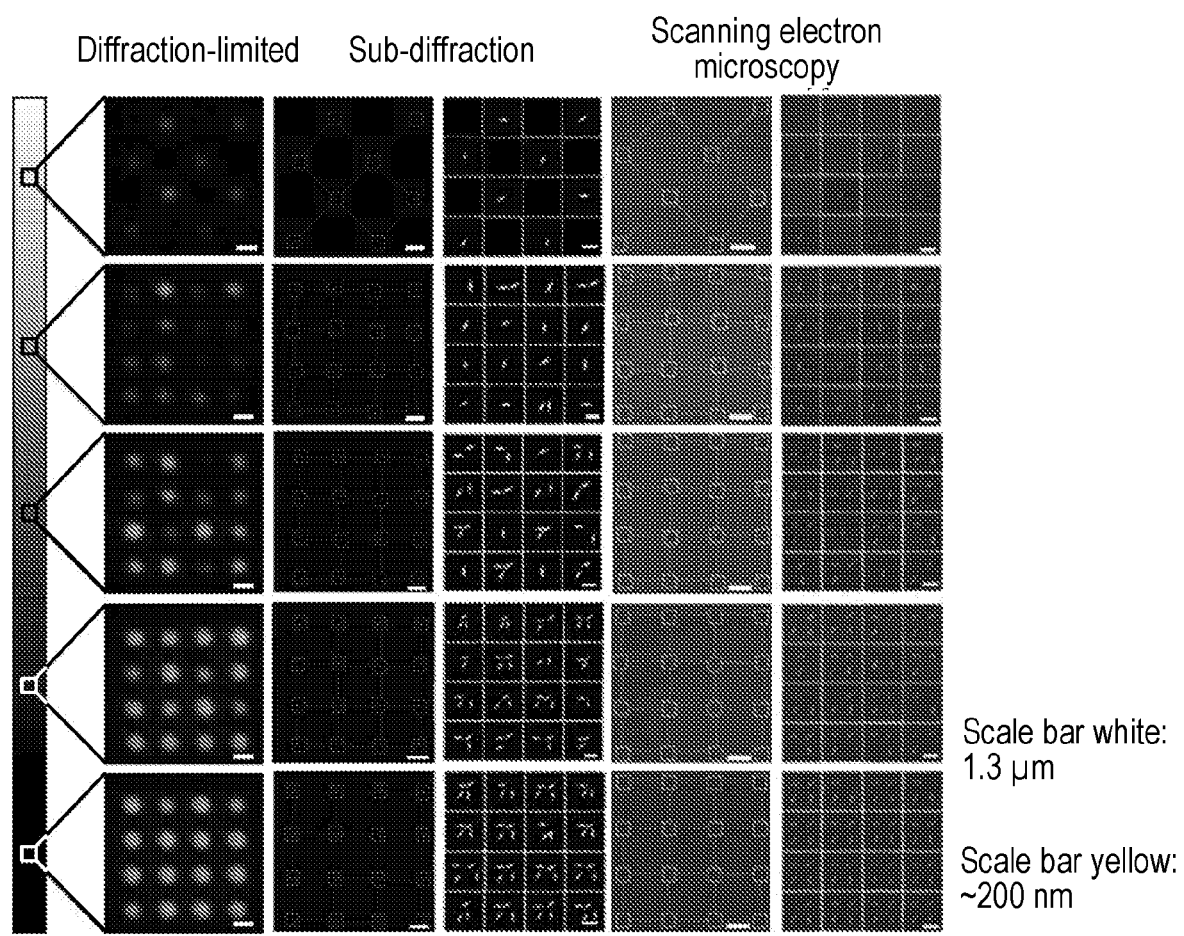
FIG. 14 is an illustration of manual adjustment of an image where all scatterers are of different orientations.

FIG. 14 is an illustration of manual adjustment where all scatterers are of different orientations. Manual encoding assures that all scatterers in proximity have different orientations. The first column from the left depicts diffraction-limited far-field images of the proximal scatterers. The second and third columns depict sub-diffraction images of the scatters after reconstruction. The fourth and fifth columns depict scanning electron microscopy images of the proximal scatterers after manual encoding.

The idea depicted in FIG. 14 is to adjust the orientations of polarization-sensitive proximal scatters below the diffraction limit so that no scatterers share the same orientation. As an example, a block consisting of 16 diffraction-limited spots is put through the reconstruction process after manual adjustment. After reconstruction, each diffraction-limited spot is transformed up to four single scatterer images.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

What is claimed is:
1. An image reconstruction method, comprising:
   capturing a reference image of the specimen;
   capturing a set of original images based on the reference image, where each original image of the set of original images has a corresponding amplitude, phase, and polarization;
   generating a set of analyzed images based on the set of original images by determining an intensity distribution for each pixel of each original image of the set of original images and combining the intensity distribution at each pixel location across the set of original images into an intermediate image;

identifying an object in the intermediate image; and in response to identifying the object in the intermediate image:
  determining an intensity value of the object in each original image of the set of original images;
  generating an improved image of the object based on the determined intensity value of the object;
  generating a final image including the improved image of the object; and
  displaying the final image.

2. The image reconstruction method of claim 1, further comprising:
  determining the intensity value of the object in response to the intermediate image being greater than a predetermined similarity threshold to the reference image.

3. The image reconstruction method of claim 1 wherein generating the set of analyzed images includes:
  identifying pixel intensities of a plurality of pixels in each original image across the set of original images;
  calculating the intensity distribution for each pixel of the plurality of pixels of each original image of the set of original images to generate the set of analyzed images; and
  generating the intermediate image by, for each pixel of the plurality of pixels, combining the calculated intensity at each pixel across each analyzed image of the set of analyzed images.

4. The image reconstruction method of claim 3 wherein the intensity distributions are background-free and noise-free.

5. The image reconstruction method of claim 3, wherein each analyzed image of the set of analyzed images includes, at each pixel location of a selected analyzed image, the intensity distribution of the pixel corresponding to the object location in the original image.

6. The image reconstruction method of claim 3, wherein obtaining the intensity distribution includes applying an optimization algorithm to each pixel of the plurality of pixels.

7. The image reconstruction method of claim 6 wherein the optimization algorithm is a fast-iterative shrinkage-thresholding algorithm.

8. The image reconstruction method of claim 1, wherein the set of original images is captured by adjusting a voltage of a voltage tunable polarizer and capturing each original image of the set of original images at a transmission polarization direction corresponding to the voltage.

9. The image reconstruction method of claim 1, wherein the corresponding amplitude, phase, and polarization of each original image of the original images is captured by adjusting the amplitude and the phase using a spatial light.

10. The image reconstruction method of claim 1, wherein a highest intensity value of the object indicates a resolved object, and where the final image includes an image of each object at the amplitude, phase, and polarization where the object is resolved.

11. The image reconstruction method of claim 1, wherein, in response to the intermediate image being less than a predetermined similarity threshold to the reference image, displaying the intermediate image.

12. The image reconstruction method of claim 1, further comprising analyzing the intermediate image by identifying a highest intensity of each object based on a difference in the intensity value between each original image of the set of original images and combining the corresponding original image of the set of original images having the highest intensity of each object into the intermediate image to generate the final image.

13. A photographic imaging system, comprising:
  a camera that captures images of objects of interest;
  a voltage-tunable polarizer disposed in light path of the camera, wherein, in response to a voltage applied thereto, the voltage-tunable polarizer changes polarization state of light propagating therethrough without mechanical rotation of the voltage-tunable polarizer itself;
  a controller operably coupled to the voltage-tunable polarizer to supply voltage to the voltage-tunable polarizer; and
  a processor and associated memory for storing instructions that, upon execution, cause the processor to:
    capture a reference image of the specimen;
    capture a set of original images based on the reference image, where each original image of the set of original images has a corresponding amplitude, phase, and polarization;
    generate a set of analyzed images based on the set of original images by determining an intensity distribution for each pixel of each original image of the set of original images and combining the intensity distribution at each pixel location across the set of original images into an intermediate image;
    identifying an object in the intermediate image; and
    in response to identifying the object in the intermediate image:
      determine an intensity value of the object in each original image of the set of original images;
      generate an improved image of the object based on the determined intensity value of the object;
      generate a final image including the improved image of the object; and
      display the final image.

14. The photographic imaging system of claim 13, wherein the instructions, upon execution, cause the processor to:
  determine the intensity value of the object in response to the intermediate image being greater than a predetermined similarity threshold to the reference image.

15. The photographic imaging system of claim 13, wherein the instructions, upon execution, cause the processor to:
  generate the set of analyzed images by:
    identifying pixel intensities of a plurality of pixels in each original image across the set of original images;
    calculating the intensity distribution for each pixel of the plurality of pixels of each original image of the set of original images to generate the set of analyzed images; and
    generating the intermediate image by, for each pixel of the plurality of pixels, combining the calculated intensity at each pixel across each analyzed image of the set of analyzed images.

16. The photographic imaging system of claim 13, wherein the set of original images is captured by adjusting the voltage of the voltage tunable polarizer and capturing each original image of the set of original images at a transmission polarization direction corresponding to the voltage.

17. The photographic imaging system of claim 13, wherein the corresponding amplitude, phase, and polarization of each original image of the original images is captured by adjusting the amplitude and the phase using a spatial light.

18. The photographic imaging system of claim 13, wherein a highest intensity value of the object indicates a resolved object, and where the final image includes an image of each object at the amplitude, phase, and polarization where the object is resolved.

19. The photographic imaging system of claim 13, wherein, in response to the intermediate image being less than a predetermined similarity threshold to the reference image, displaying the intermediate image.

20. The photographic imaging system of claim 13, further comprising analyzing the intermediate image by identifying a highest intensity of each object based on a difference in the intensity value between each original image of the set of original images and combining the corresponding original image of the set of original images having the highest intensity of each object into the intermediate image to generate the final image.

* * * * *